United States Patent
Choi et al.

(10) Patent No.: US 10,551,661 B2
(45) Date of Patent: Feb. 4, 2020

(54) TEMPERATURE DETECTION CIRCUIT FOR DISPLAY DEVICE

(71) Applicant: SAMSUNG DISPLAY CO., LTD., Yongin-si, Gyeonggi-do (KR)

(72) Inventors: Minsoo Choi, Hwaseong-si (KR); Seunghwan Moon, Asan-si (KR); Okkwon Shin, Seoul (KR); Junpyo Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 101 days.

(21) Appl. No.: 15/866,067

(22) Filed: Jan. 9, 2018

(65) Prior Publication Data

US 2018/0196301 A1 Jul. 12, 2018

(30) Foreign Application Priority Data

Jan. 12, 2017 (KR) .......................... 10-2017-0005405

(51) Int. Cl.
*G09G 3/36* (2006.01)
*G02F 1/1333* (2006.01)

(52) U.S. Cl.
CPC ..... *G02F 1/133382* (2013.01); *G09G 3/3648* (2013.01); *G09G 2320/041* (2013.01)

(58) Field of Classification Search
CPC ................ G09G 3/006; G09G 3/3648; G09G 2310/0221; G09G 2320/0209;
(Continued)

(56) References Cited

U.S. PATENT DOCUMENTS 4,733,370 A * 3/1988 Kitajima ................ G11C 7/005
365/108
6,191,839 B1 2/2001 Briley et al.
(Continued)

FOREIGN PATENT DOCUMENTS

| JP | 4880002 B2 | 2/2012 |
|---|---|---|
| KR | 100771175 B1 | 10/2007 |
| KR | 100820843 B1 | 4/2008 |

OTHER PUBLICATIONS

Elliott Sound Products, Precision Rectifiers, 12 Pages, Retrieved on May 30, 2018.
(Continued)

*Primary Examiner* — Towfiq Elahi
(74) *Attorney, Agent, or Firm* — Cantor Colburn LLP

(57) ABSTRACT

A liquid crystal display device includes an upper substrate, a lower substrate including a data line and a gate line insulated from the data line, a liquid crystal layer between the lower substrate and the upper substrate, a current sensing unit which detects a data current based on a data signal applied to the data line so as to detect a change in a liquid crystal capacitance of the liquid crystal layer, a rectifying amplifier which rectifies or amplifies the detected data current so as to generate and output a rectified signal, a pulse generator which generates a sensing pulse by comparing the rectified signal with a reference voltage, and a duty width detector which detects a duty width of the sensing pulse generated by the pulse generator where the reference voltage is set based on a voltage difference between data signals successively applied to the data line.

21 Claims, 17 Drawing Sheets

(58) Field of Classification Search
CPC ... G09G 2320/0223; G09G 2320/0252; G09G 2320/0666; G09G 2340/16; G09G 2360/16; G09G 2320/041; G09G 2320/029; G02F 1/133382
See application file for complete search history.

(56) References Cited

U.S. PATENT DOCUMENTS 6,333,728 B1    12/2001   Libsch et al.
2010/0214271 A1*   8/2010   Mizusako ............ G09G 3/3648
                                                                            345/204

OTHER PUBLICATIONS

Extended European Search Report for application No. 18150537.1 dated Jun. 8, 2018.

* cited by examiner

| Temp. | 0℃ | 10℃ | 20℃ | 30℃ | 40℃ | 50℃ | 60℃ |
|---|---|---|---|---|---|---|---|
| $e_{//}$ | 3.6 | 3.6 | 3.6 | 3.6 | 3.6 | 3.7 | 3.8 |
| $e\perp$ | 7.4 | 7.1 | 6.7 | 6.4 | 6.1 | 5.8 | 5.5 |
| $\Delta e$ | -3.8 | -3.5 | -3.1 | -2.8 | -2.5 | -2.1 | -1.7 |

FIG. 5A
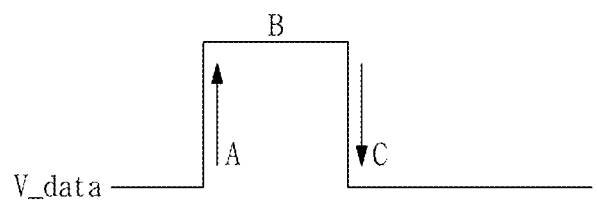
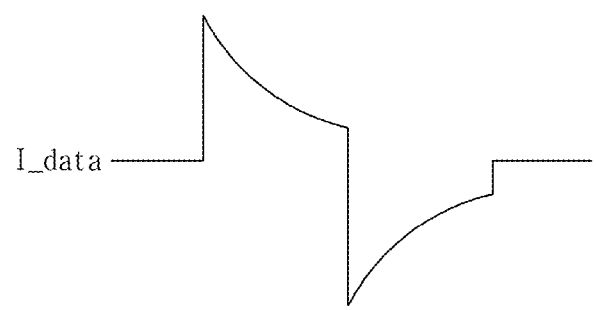
FIG. 5B
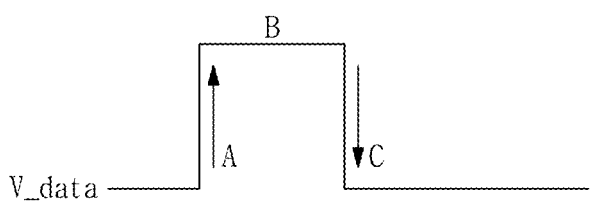
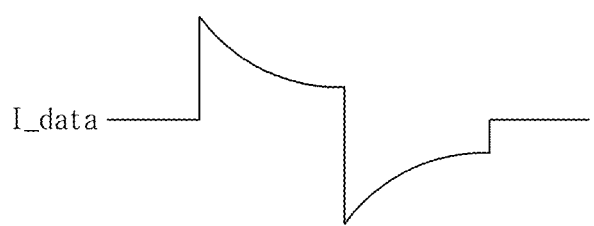

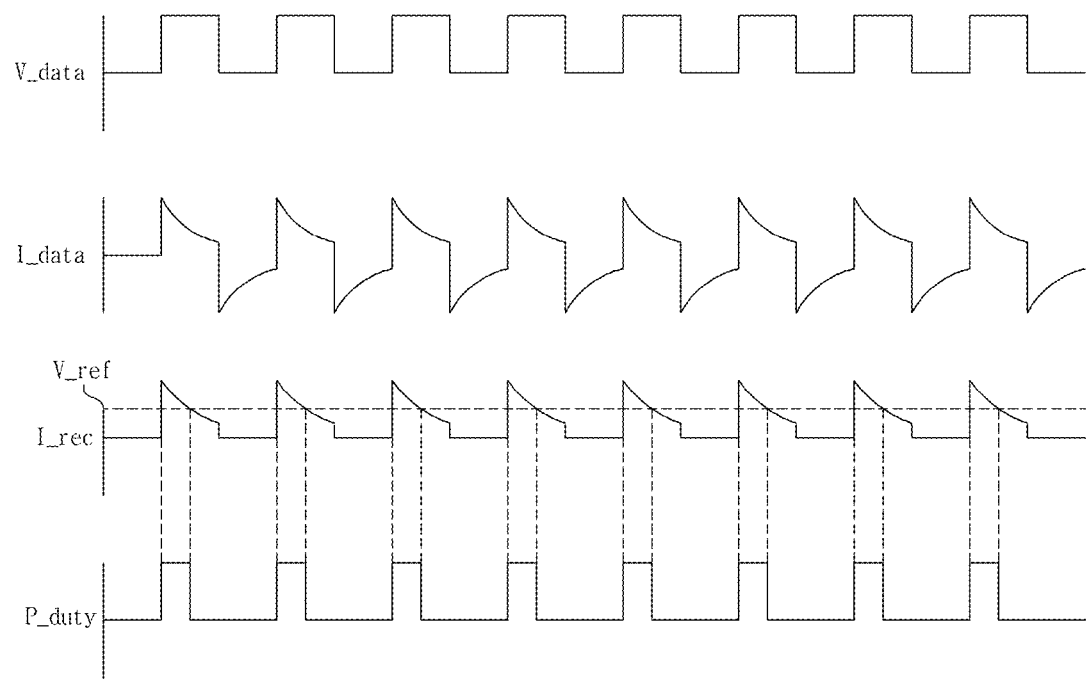

TEMPERATURE DETECTION CIRCUIT FOR DISPLAY DEVICE

This application claims priority to Korean Patent Application No. 10-2017-0005405, filed on Jan. 12, 2017, and all the benefits accruing therefrom under 35 U.S.C. § 119, the content of which in its entirety is herein incorporated by reference.

1 FIELD

Exemplary embodiments of the invention relate to a display device for detecting a liquid crystal temperature of a display panel and controlling a driving voltage according to a temperature change.

2 DESCRIPTION OF THE RELATED ART

Recently, as an information society has developed rapidly, there has been an increasing need for a flat panel display device having excellent characteristics such as thinness, light weight and low power consumption. Among various types of flat panel display devices, liquid crystal display ("LCD") devices are superior in resolution, color display and image quality, and are actively applied to monitors of various electronic devices such as laptop and desktop computers.

In general, two substrates including electrodes formed thereon are arranged in an LCD device so that surfaces on which the two electrodes are formed face each other and a liquid crystal material is injected between the two substrates, thereby allowing liquid crystal molecules to move by an electric field which is generated upon applying a voltage to the two electrodes. An image may be expressed by the transmittance of light depending on the movement of the liquid crystal molecules.

Such an LCD device includes a liquid crystal panel in which liquid crystals are injected between two substrates, a backlight positioned below the liquid crystal panel and used as a light source and a driving unit positioned outside the liquid crystal panel and driving the liquid crystal panel.

Liquid crystals of the LCD device differ in their dielectric constant values depending on a temperature. A permittivity of the liquid crystal is classified into a parallel permittivity ($\varepsilon\|$) when the liquid crystal molecules are arranged in a direction parallel to the substrate, that is, when the liquid crystal molecules are arranged in the direction perpendicular to the transmission direction of the light from the backlight, and a vertical permittivity ($\varepsilon\perp$) when the liquid crystal molecules are arranged in a direction perpendicular to the substrate, that is, when the liquid crystal molecules are arranged in the direction parallel to the transmission direction of the light from the backlight. A difference between the parallel permittivity ($\varepsilon\|$) and the vertical permittivity ($\varepsilon\perp$) is defined as a difference permittivity ($\Delta\varepsilon$).

SUMMARY

FIG. 1 is a table showing changes in parallel permittivity ($\varepsilon\|$), vertical permittivity ($\varepsilon\perp$) and difference permittivity ($\Delta\varepsilon$) depending on the temperature of liquid crystals.

Referring to FIG. 1, as a temperature of a liquid crystal material rises, the vertical permittivity ($\varepsilon\perp$) decreases sharply. The parallel permittivity increases slightly as the temperature rises. Accordingly, a difference permittivity ($\Delta\varepsilon$) which is the difference between the parallel permittivity ($\varepsilon\|$) and the perpendicular permittivity ($\varepsilon\perp$) has a tendency to increase as the temperature increases. When the permittivity of the liquid crystal material changes depending on the temperature, a kickback voltage may change and a flickering phenomenon may occur on the display panel due to this change. Further, the driving state of pixels may change as the degree of delay of a driving signal applied to the pixel is changed.

Exemplary embodiments of the invention may be directed to a method of detecting a current of a driving signal that varies according to a permittivity of a liquid crystal material, calculating an operating temperature of the liquid crystal material and controlling the driving signal so as to compensate for an operation change depending on the temperature of the liquid crystal material, thereby improving display quality of a liquid crystal display ("LCD") device.

According to an exemplary embodiment, a liquid crystal display device includes an upper substrate, a lower substrate opposing the upper substrate and including a data line and a gate line insulated from the data line, a liquid crystal layer between the lower substrate and the upper substrate, a current sensor which detects a data current based on a data signal applied to the data line so as to detect a change in a liquid crystal capacitance of the liquid crystal layer, a rectifying amplifier which rectifies or amplifies the detected data current so as to generate and output a rectified signal, a pulse generator which generates a sensing pulse by comparing the rectified signal with a reference voltage, and a duty width detector which detects a duty width of the sensing pulse generated by the pulse generator. The reference voltage is set based on a voltage difference between data signals successively applied to the data line.

In an exemplary embodiment, the liquid crystal display device may further include a temperature calculator which calculates a temperature of the liquid crystal layer based on the duty width of the sensing pulse.

In an exemplary embodiment, the reference voltage may be proportional to a voltage difference between the data signal applied to the data line and a data signal applied during a previous horizontal synchronization period.

In an exemplary embodiment, the reference voltage may have a voltage value between a lowest voltage and a highest voltage of the rectified signal corresponding to the data current during a horizontal synchronization period.

In an exemplary embodiment, the pulse generator may generate the plurality of sensing pulses having a substantially same duty width when a temperature of the liquid crystal layer is constant.

In an exemplary embodiment, a sensing pulse of the plurality of sensing pulses may have a narrower pulse width as a temperature of the liquid crystal layer rises.

In an exemplary embodiment, the current sensor may include at least one of a sensing resistor, a photo-coupler and a current mirror circuit.

In an exemplary embodiment, the liquid crystal display device may further include data lines, and the current sensor may be separately connected to each of the data lines and detects the data current for each of the data lines.

In an exemplary embodiment, the current sensor may be integrated with the data driver which applies the data signal to the data line.

In an exemplary embodiment, the liquid crystal display device may further include a plurality of data lines, and the current sensor may be connected to the plurality of data lines and detects the data current by summing the data currents applied to the plurality of data lines.

In an exemplary embodiment, the rectifying amplifier may separate and rectify a positive current and a negative current of the data current.

According to another exemplary embodiment, a liquid crystal display device includes a display panel, a pixel on the display panel, the pixel including a liquid crystal layer having a liquid crystal capacitance that varies depending on a temperature change, a data driver which applies a data signal to the pixel and a gate driver which applies a gate signal to the pixel, a timing controller which controls the data driver and the gate driver, and a temperature sensor which detects a temperature of the liquid crystal layer. The temperature sensor includes a current sensing unit which detects a data current generated by the data signal, a rectifying amplifier which rectifies or amplifies the detected data current so as to output a rectified signal, a reference voltage conversion unit which sets a reference voltage based on a voltage difference between the data signals successively applied to the data line, a pulse generator which compares the rectified signal with the reference voltage so as to generate a sensing pulse, a duty width detector which detects a duty width of the sensing pulse output from the pulse generator, and a temperature calculator which determines the temperature of the liquid crystal layer based on the duty width. The timing controller corrects an input image data based on the temperature of the liquid crystal layer output from the temperature sensor.

In an exemplary embodiment, the timing controller may receive red, green and blue image data and corrects the red, green and blue image data with a correction gamma value, and the timing controller may correct the red, green and blue image data by applying a less correction gamma value as the sensed temperature is higher.

In an exemplary embodiment, the timing controller may apply different correction gamma values for respective colors to correct light emission characteristics of red, green and blue pixels.

In an exemplary embodiment, the timing controller may apply a correction value so that an image data of a current frame increases from an image data of a previous frame, and the correction value when the sensed temperature is relatively high may be less than the correction value when the sensed temperature is relatively low.

In an exemplary embodiment, the timing controller may increase an application period of the gate signal depending on a degree of separation between the pixel to which the gate signal is applied and the data driver.

In an exemplary embodiment, the application period of the gate signal by the timing controller may be shorter when the sensed temperature is relatively high as compared to the application period of the gate signal when the sensed temperature is relatively low.

In an exemplary embodiment, the gate driver may output a plurality of gate signals overlapping one data signal.

In an exemplary embodiment, one of the plurality of gate signals may overlap a plurality of data signals.

In an exemplary embodiment, the reference voltage conversion unit may vary the reference voltage according to a number of the plurality of gate signals overlapping the data signal.

The foregoing is illustrative only and is not intended to be in any way limiting. In addition to the illustrative exemplary embodiments, exemplary embodiments, and features described above, further exemplary embodiments, exemplary embodiments, and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which:

FIGS. 5A and 5B are views illustrating a voltage value and a current value of a data signal measured depending on the temperature;

FIG. 8 is a view illustrating an example of an output waveform corresponding to each step of FIG. 7;

DETAILED DESCRIPTION

Figures 1, 2:
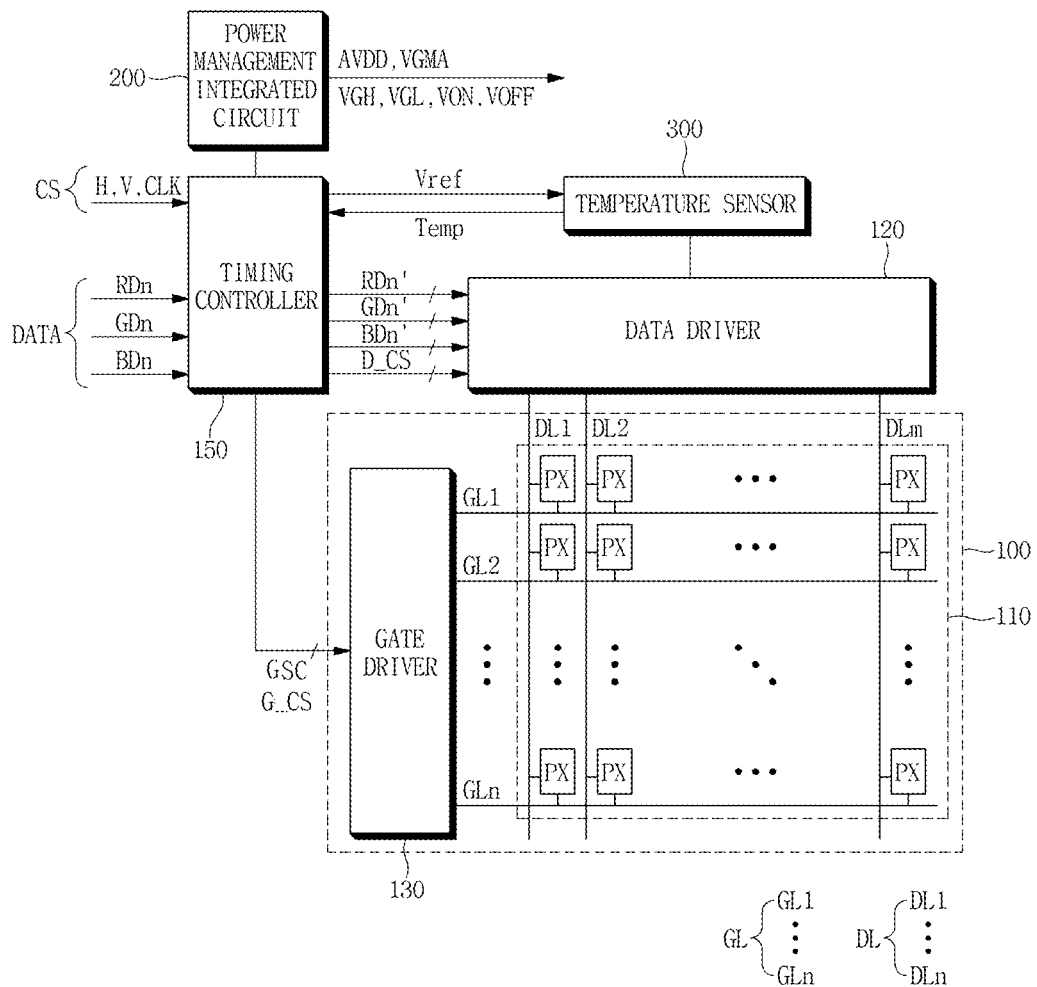
FIG. 1 is a table showing changes in parallel permittivity ($\varepsilon\|$), vertical permittivity ($\varepsilon\perp$) and a difference permittivity ($\Delta\varepsilon$) depending on the temperature of liquid crystals.
FIG. 2 is a configuration diagram illustrating an exemplary embodiment of a display device.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe exemplary embodiments of the invention, and like reference numerals refer to like elements throughout the specification.

FIG. 2 is a configuration diagram illustrating a display device according to an exemplary embodiment.

As illustrated in FIG. 2, the display device according to an exemplary embodiment includes a display panel 100, a pixel area 110, a data driver 120, a gate driver 130, a timing controller T-CON 150, a power management integrated circuit ("IC") PMIC 200 and a temperature sensor 300.

Although not illustrated, when the display panel 100 is a liquid crystal display ("LCD") panel, an LCD device including the display panel 100 may further include a backlight unit (not illustrated) providing light to the display panel 100 and a pair of polarizers (not illustrated). In an exemplary embodiment, the LCD panel may be in one of a vertical alignment ("VA") mode, a patterned vertical alignment ("PVA") mode, an in-plane switching ("IPS") mode, an fringe-field switching ("FFS") mode and a plane to line switching ("PLS") mode, for example, but is not limited to panels of a particular mode.

The display panel 100 includes a plurality of gate lines GL1 to GLn, a plurality of data lines DL1 to DLm crossing and insulated, by a dielectric layer, from the plurality of gate lines GL1 to GLn and a plurality of pixels PX electrically connected to the plurality of gate lines GL1 to GLn and the plurality of data lines DL1 to DLm where n and m are natural numbers. The plurality of gate lines GL1 to GLn are connected to the gate driver 130 and the plurality of data lines DL1 to DLm are connected to the data driver 120.

The data driver 120 includes a plurality of data driving ICs (not illustrated). The data driving ICs may include thin film transistors ("TFTs") and may be disposed (e.g., mounted) directly on the display panel 100. The data driver 120 receives digital image data signals RDn', GDn' and BDn' and a data driving control signal D_CS from the T-CON 150. The data driver 120 samples the digital image data signals RDn', GDn' and BDn' according to the data driving control signal D_CS, then latches the sampling image data signals corresponding to one horizontal line in each horizontal period, and applies the latched image data signals to the data lines DL1 to DLm.

The gate driver 130 receives a gate-on voltage VON, a gate-off voltage VOFF and gate driving voltages VGH and VGL from the PMIC 200 and receives a gate driving control signal G_CS and a gate shift clock GSC from the T-CON 150. The gate driver 130 sequentially generates gate pulse signals in response to the gate driving control signal G_CS and the gate shift clock GSC and applies the gate pulse signals to the gate lines GL1 to GLn.

The T-CON 150 receives input image data DATA including red, green and blue input image data RDn, GDn and BDn, generates digital image data signals RDn', GDn' and BDn', and applies digital image data signals RDn', GDn' and BDn' to the data driver 120. The T-CON 150 generates the data driving control signal D_CS and the gate driving control signal G_CS based on an input control signal CS. Specifically, the T-CON 150 generates the data driving control signal D_CS and the gate driving control signal G_CS according to a clock signal CLK using a horizontal synchronization signal H and a vertical synchronization signal V, and applies the data driving control signal D_CS to the data driver 120 and the gate driving control signal G_CS to the gate driver 130. In such an exemplary embodiment, the data driving control signal D_CS may include a source shift clock, a source start pulse, a data output enable signal, or the like, and the gate driving control signal G_CS may include a gate start pulse, a gate output enable signal, or the like.

The PMIC 200 applies, to the data driver 120, an analog driving voltage AVDD and a gamma voltage VGMA, which are reference voltages for converting an image signal. The data driver 120 receives the analog driving voltage AVDD and the gamma voltage VGMA input from the PMIC 200. The data driver 120 receives the digital image data signals RDn', GDn' and BDn' from the T-CON 150, converts the digital image data signals RDn', GDn' and BDn' into analog image data signals and apply the analog image data signals to the data lines DL1 to DLm.

Figure 3:
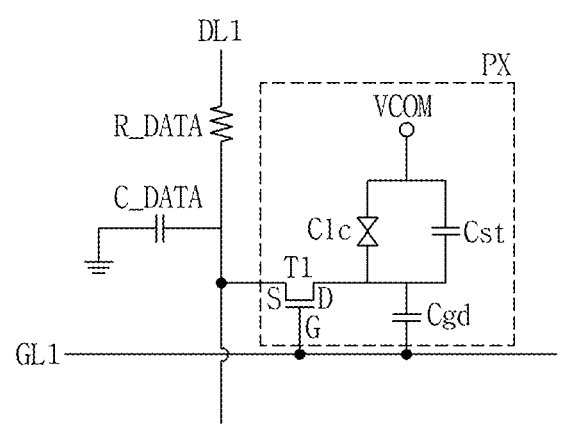
FIG. 3 is an equivalent circuit diagram of a pixel and a circuit diagram when a data signal is applied.

FIG. 3 is an equivalent circuit diagram illustrating a pixel and a circuit diagram when a data signal is applied.

Referring to FIG. 3, a data line DL1 connected to a pixel PX includes a parasitic resistor R_DATA and a parasitic capacitor C_DATA which are formed by the structure and material of the data line DL1. The pixel PX is positioned at intersections of the data line DL1 and the gate line GL1 and a gate G of a driving transistor T1 is connected to the gate line GL1 and a source S of the driving transistor T1 is connected to the line DU. A drain D of the switching transistor T1 is connected to a pixel electrode. The pixel PX includes a gate-drain capacitor Cgd formed by the pixel electrode and the gate line GL1 opposing each other, a pixel capacitor Clc formed by the pixel electrode and a common electrode VCOM opposing each other with a liquid crystal material therebetween and a storage capacitor Cst formed by the pixel electrode and the common electrode VCOM opposing each other absent the liquid crystal material therebetween.

The gate-drain capacitor Cgd and the storage capacitor Cst form a capacitor with a solid dielectric layer between opposing end electrodes, while the pixel capacitor Clc uses a liquid crystal material between the electrodes as a dielectric layer. In general, the capacitance C of a capacitor is determined by an area A of two opposing electrodes constituting the capacitor, a distance d between the two opposing electrodes and an insulation material (ε: permittivity) interposed between the two opposing electrodes.

$$C = \varepsilon(A/d) \qquad \text{<Equation 1>}$$

Considering the above Equation 1, the capacitance of the capacitor included in the pixel PX may vary according to a change in permittivity (ε) of the insulation material, since the area A and the distance d of the opposing electrodes are fixed.

As described above with reference to FIG. 1, the permittivity (ε) of the liquid crystal material may vary depending on the temperature, and in particular, the vertical permittivity (ε⊥) tends to decrease significantly in accordance with an increase in temperature. Accordingly, the capacitance of the pixel capacitor Clc decreases in inverse proportion to the rise of the temperature and the decrease of the charge amount charged in the pixel capacitor Clc results in a decrease in an applied current.

That is, when the change of the current of the data signal applied to the data line DLm is detected, the temperature of the liquid crystal material in the pixel PX may be calculated. The liquid crystal material of the pixel PX may have different response speed and tilt condition for the voltage, as well as the permittivity, depending on the temperature. When the operating condition of the liquid crystal varies depending on the temperature, an image may not be accurately implemented. Therefore, it is necessary to accurately detect the temperature of the liquid crystal material inside the pixel PX and accurately compensate for the operating condition of the liquid crystals depending on the temperature.

Figure 4:
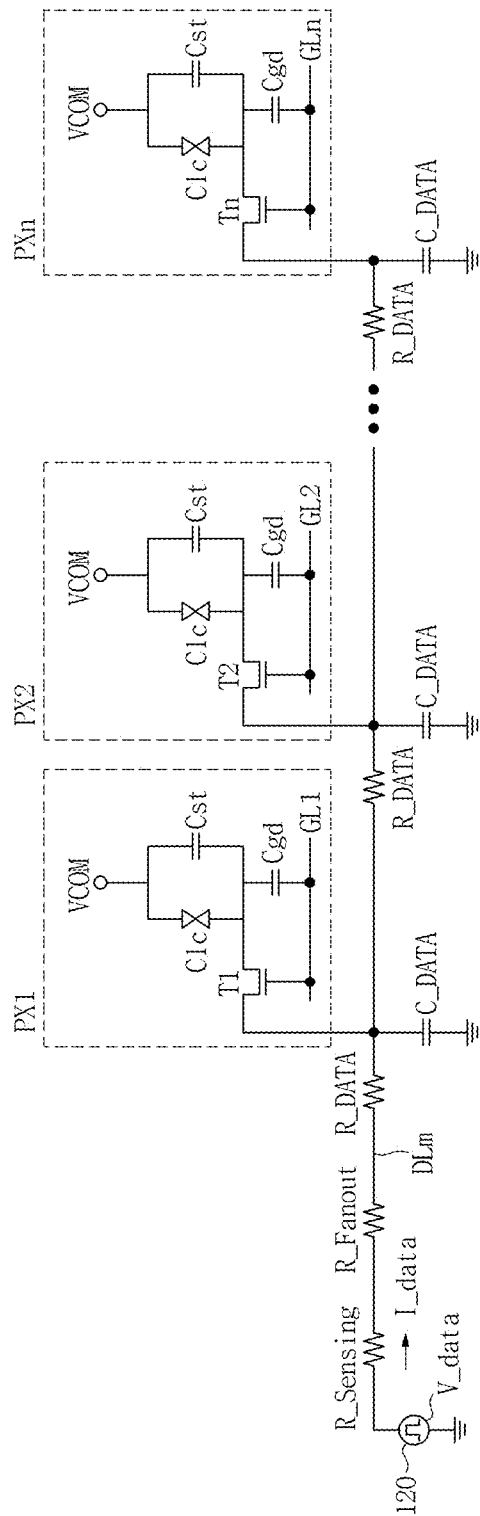
FIG. 4 is an equivalent circuit diagram illustrating a plurality of pixels connected to a single data line.

FIG. 4 is an equivalent circuit diagram illustrating a plurality of pixels connected to a single data line.

Referring to FIG. 4, the data line DLm receives a data signal V_DATA from the data driver 120 through a sensing resistor R-Sensing which is connected in series to the data line DLm. The data line DLm includes a fan-out resistor R-Fanout formed in a fanout portion connected to the sensing resistor R-Sensing. The fanout resistor R-Fanout is a parasitic resistor formed at a point where an output terminal of the data driver 120 is connected to the data line DLm of the display panel 100 and a fan-out area of the data line DL (refer to FIG. 2) in the non-display area.

The data line DLm in the display area 110 further includes a parasitic resistor R_DATA and a parasitic capacitor C_DATA. The pixel PX in the display area 110 has an equivalent circuit structure as described above with reference to FIG. 3.

The data line DLm is connected to a plurality of pixels PX1 to PXn. In an exemplary embodiment, the data line DLm is connected to sources S of switching transistors T1 to Tn of the pixels PX1 to PXn which are consecutively arranged, for example. The data line DLm includes a parasitic resistor R_DATA and a parasitic capacitor C_DATA positioned between one pixel PX and another pixel PX. The parasitic resistor R_DATA and the parasitic capacitor C_DATA may vary depending on the material and size of the data line DLm and the arrangement position of adjacent electrodes. It is assumed that in the illustrated exemplary embodiment the parasitic components formed at the data line DLm between the pixels PX are equal to each other for ease of description. However, based on the structure of the display panel 100, the parasitic components of the respective pixels PX may have different values.

The sensing resistor R-Sensing detects a data current I_data according to the data signal V_data applied to the pixels PX1 to PXn connected to the data line DLm. The data current I_data may be detected by comparing a difference between voltages of end terminals of the sensing resistor R-Sensing.

Although FIG. 4 illustrates a method of using the sensing resistor R-Sensing to detect the data current I_data by way of example. However, a method of sensing a current flowing in a conductor other than the resistance method may be used. In an exemplary embodiment, a photo-coupler or a current mirror circuit may be used to measure the current, for example.

FIGS. 5A and 5B are views illustrating a voltage value and a current value of a data signal measured depending on the temperature.

FIG. 5A shows waveforms of the data signal V_data and the data current I_data measured at room temperature of about 25 degrees Celsius (° C.). The data signal V_data is a pulse signal including a rising period A rising from a low potential to a high potential, a sustain period B maintaining a high potential and a falling period C falling from a high potential to a low potential.

The data current I_data increases sharply in the rising period A of the data signal V_data. In the sustain period B, the supply of the data current I_data gradually decreases. The data current I_data is inverted in the direction opposite to the application direction by the abrupt drop of the data signal V_data in the falling period C. The current then gradually decreases again.

FIG. 5B shows waveforms of the data signal V_data and the data current I_data measured at a relatively high temperature of about 60° C. In the high temperature state, the data signal V_data has a substantially same voltage as the voltage in room temperature state. The data current I_data exhibits a less current level in the high temperature state than that in room temperature state. This is because the capacitance of the pixel capacitor Clc (refer to FIGS. 3 and 4) decreases as the permittivity of the insulator constituting the pixel capacitor Clc of the pixel PX (refer to FIGS. 2 to 4) decreases.

Figure 6:
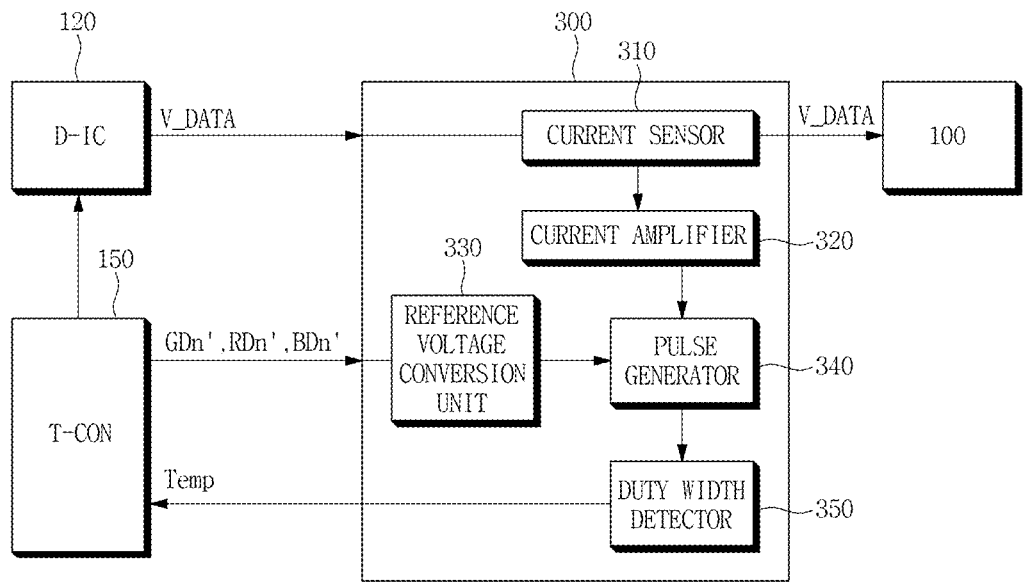
FIG. 6 is a configuration view illustrating an exemplary embodiment of the inside of a temperature sensor.

FIG. 6 is a configuration view illustrating the inside of the temperature sensor according to an exemplary embodiment.

Referring to FIG. 6, the data driver D-IC 120 of the display device applies the data signal V_data to the data line DLm of the display panel 100. The data current I_data of the applied data signal V_data is applied to the data line DLm through the current sensor 310 of the temperature sensor 300.

The data current I_data detected by the current sensor 310 has a form of gently falling after rising, as illustrated in FIGS. 5A and 5B. Further, the data current I_data may have two cases, one in which the data current I_data has a positive data current I_data by applying a higher voltage than a voltage of a data signal V_data applied immediately before, and another in which the data current I_data has a negative data current I_data by applying a lower voltage than a voltage of a data signal V_data applied immediately before.

The data current I_data sensed by the current sensor 310 is input to the rectifying amplifier 320. The rectifying amplifier 320 separates the positive polarity part and the negative polarity part of the data current I_data from each other and converts the negative current part into a positive current and rectifies it.

The measured data current I_data has a small value and is not suitable for signal processing, and thus the data current I_data is amplified using the rectifying amplifier 320. In such an exemplary embodiment, it is preferable to use a differential amplifier for the amplifier. The amplified data current is output as a rectified signal I_rec (refer to FIG. 8) and input to the pulse generator 340.

The pulse generator 340 receives the rectified signal I_rec amplified by the rectifying amplifier 320 and receives a reference voltage Vref (refer to FIGS. 7 and 8) from a reference voltage conversion unit 330. The pulse generator 340 compares the amplified current signal with the reference voltage Vref to detect an amplified current signal exceeding the reference voltage Vref to generate a new sensing pulse.

It is preferable that the reference voltage Vref be located at a section where the current signal gently decreases so as to detect a change of the rectified signal I_rec under the low temperature and high temperature conditions.

When the reference voltage Vref is set to be significantly low, the rectified signal I_rec exceeds the reference voltage Vref under both the low temperature and high temperature conditions and the change of the rectified signal I_rec due to the temperature change may not be identified. When the reference voltage Vref is set to be significantly high, the width of the sensing pulse may be too narrow or the sensing pulse may not be detected under the low temperature and high temperature conditions.

The reference voltage Vref according to an exemplary embodiment may vary depending on the applied data signal V_data. The reference voltage conversion unit 330 determines the reference voltage Vref based on the variation voltage of the applied data signal V_data. A specific method of determining the reference voltage Vref will be described later in the description with reference to FIGS. 9, 10, 11 and 12.

The duty width detector 350 analyzes the sensing pulse output from the pulse generator 340 to detect a duty width and calculate a temperature of the liquid crystal layer. The duty width detector 350 may sum up on times of the sensing pulse within a reference period or analyze a ratio of the on time and an off time. The duty width detector 350 may further include a temperature calculator that calculates a temperature calculation value based on the sensing pulse. The temperature calculator may make a reference to the temperature value corresponding to the duty width by referring to a stored look-up table.

The T-CON 150 may correct image degradation of the display panel 100 related to the temperature characteristic based on the calculated temperature of the liquid crystal layer of the display panel 100. The correction method depending on the temperature detection may use gamma table correction, color temperature correction, or the like.

Figure 7:
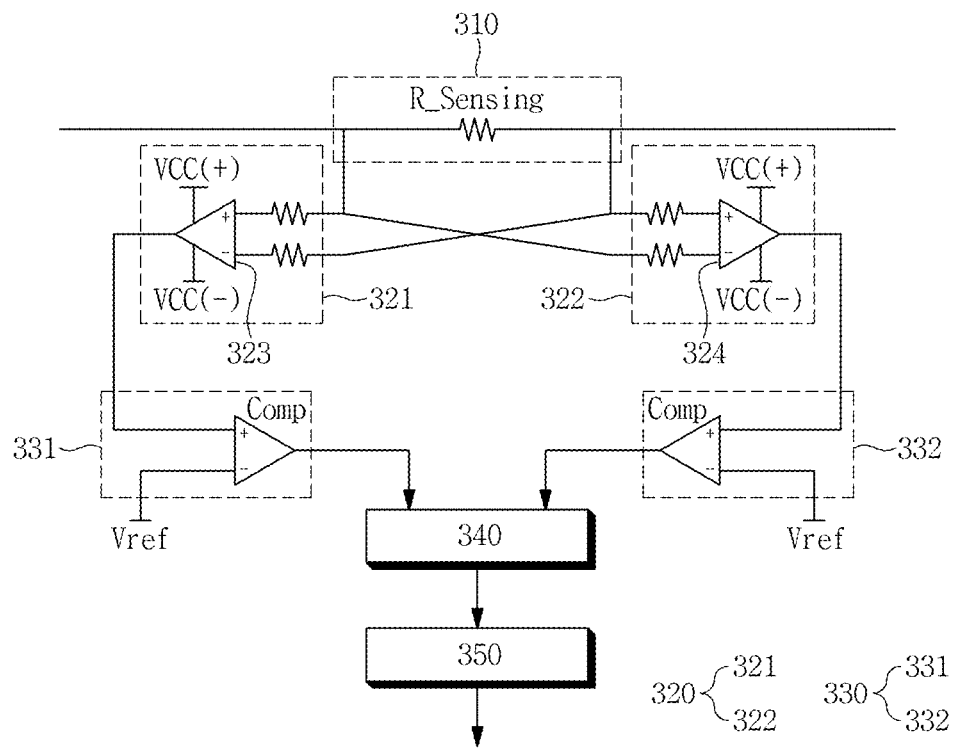
FIG. 7 is a circuit diagram illustrating a temperature measuring circuit.

FIG. 7 is a circuit diagram illustrating a temperature sensing circuit.

Referring to FIG. 7, the current sensor 310 includes a sensing resistor R-Sensing. The sensing resistor R-Sensing is disposed between an output terminal of the data driver 120 (refer to FIG. 6) and the data line DL (refer to FIG. 2). In addition, the current sensor 310 may be embedded in an output buffer end of the data driver 120. The current sensor 310 detects a voltage difference between opposite ends of the sensing resistor R-Sensing and outputs the voltage difference to the rectifying amplifier 320.

The rectifying amplifier 320 includes a first rectifying amplifier 321 and a second rectifying amplifier 322. The first rectifying amplifier 321 includes a first differential amplifier 323. A first input terminal of the first differential amplifier 323 receives a voltage of an input terminal of the sensing resistor R-Sensing and a second input terminal receives a voltage of an output terminal of the sensing resistor R-Sensing. The differential amplifier is a circuit that amplifies the voltage difference of the signal applied to the input terminal. The input terminal includes a positive voltage terminal and a negative voltage terminal. In the case of a non-inverting differential amplifier, a difference between the voltage of the positive voltage terminal and the voltage of the negative voltage terminal is output as a positive voltage. The first differential amplifier 323 outputs a value obtained by rectifying a negative current. The second differential amplifier 324 outputs a value obtained by rectifying a positive current. The rectifying amplifier 320 outputs a positive rectified signal I_rec in both the first rectifying amplifier 321 and the second rectifying amplifier 322. The rectified signals I_rec output from the first rectifying amplifier 321 and the second rectifying amplifier 322 have a phase difference of 180 degrees and do not overlap each other on the time axis. In an exemplary embodiment, each of the first differential amplifier 323 and the second differential amplifier 324 may receive a positive supply voltage VCC (+) and a negative supply voltage VCC (−).

The rectified signals I_rec output from the first rectifying amplifier 321 and the second rectifying amplifier 322 are input to a first pulse generator 331 and a second pulse generator 332, respectively.

The pulse generator 340 includes a comparator Comp and an input current waveform is input to a positive terminal of the comparator Comp and the reference voltage Vref is input to a negative terminal thereof. The comparator Comp compares the reference voltage Vref input to the negative terminal with the input current waveform so as to output an input current waveform higher than the reference voltage Vref as a high potential voltage and outputs an input current waveform less than the reference voltage Vref as a low potential voltage. That is, the pulse generator 340 may extract only a part exceeding the reference voltage Vref from the input current waveform and output the extracted part as a sensing pulse. The input current waveform has different current application patterns due to the change of the pixel capacitor depending on the temperature. Accordingly, the timing of the current waveform exceeding the reference voltage Vref may also vary depending on the temperature and the on-time of the sensing pulse may vary depending on the temperature.

The reference voltage Vref may be provided through the use of a constant direct current ("DC") voltage source. However, in an exemplary embodiment, the reference voltage Vref may be changed within a frame operation period based on an image data applied according to an input image. The reference voltage conversion unit 330 predicts that the polarity and magnitude of the data current I_data change based on the image input signal, and may set an optimum reference voltage Vref so that the sensing pulse only considers the influence of the temperature regardless of the data signal V_data that varies based on an image.

The duty width detector 350 calculates the sensing pulse output from the pulse generator 340. The duty width detector 350 may detect an entire duty width by summing the on times of the sensing pulse for a predetermined period such as a vertical synchronization frame. It is also possible to measure the temperature deviation based on the difference between the individual on-times of the sensing pulse, but using a small number of sensing pulses may result in a measurement error. Such measurement errors may be reduced by increasing the number of measurement sensing pulses by, for example, summing the on-times of the plurality of sensing pulses for a certain period or calculating an average. The result of the duty width detector may have different output values depending on the temperature.

The temperature calculator may receive the result of the duty width detector 350 and calculate the temperature by comparing the result with a lookup table stored with temperature values. The calculated temperature is the result of indirect measurement, but the temperature is measured using the change of the state of the liquid crystal layer. As such, the tendency depending on the operation of the liquid crystal material may be directly reflected, as compared to the temperature sensed as compared to the temperature detected on a back surface of a conventional panel or a conventional driving circuit board. In an exemplary embodiment, it is illustrated that the temperature calculator is embedded in the duty width detector 350 by way of example to calculate temperature. However, since the result Temp of the duty width detector 350 itself has a value proportional to the temperature, conversion to the temperature value may not be invariably necessary. The result Temp of the duty width detector 350 may be directly used in the T-CON 150 (refer to FIGS. 2 and 6), without configuring the temperature calculator, according to the configuration of the system.

FIG. 8 is a view illustrating an example of an output waveform corresponding to each step of FIG. 7.

Referring to FIG. 8, the data signal V_data is applied as a periodic data signal pulse. The data current I_data detected by the sensing resistor R-Sensing has a steep rising portion in the rising period of the data signal and gradually decreases in the signal sustain period. Thereafter, the data current I_data has a shape that sharply rises to a negative polarity in the falling period of the signal and then gradually decreases in the sustain period. As the signal repeats, the positive signal and the negative signal of the data current I_data appear symmetric.

The data current I_data is rectified by the rectifying amplifier 320 and only the rectified signal I_rec having one of a positive polarity or a negative polarity is output. In FIG. 8, rectification of a positive current signal is illustrated by way of example. Although not illustrated, when a negative current signal is rectified, a current waveform having a phase difference of 180 degrees from the current signal illustrated in FIG. 8 is output.

An area exceeding the reference voltage Vref in the rectified signal I_rec is converted by the pulse generator 340 and output as a sensing pulse P_duty. A waveform of the rectified signal I_rec changes depending on the temperature and a pulse width of the sensing pulse P_duty may be changed.

Figure 9A:
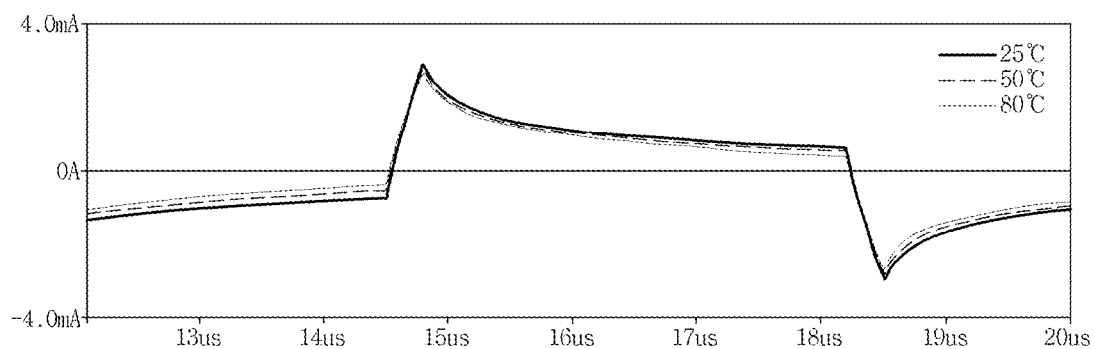
FIG. 9A is a waveform diagram illustrating a data current depending on the temperature.

FIG. 9A is a waveform diagram illustrating a data current depending on the temperature.

Figure 9B:
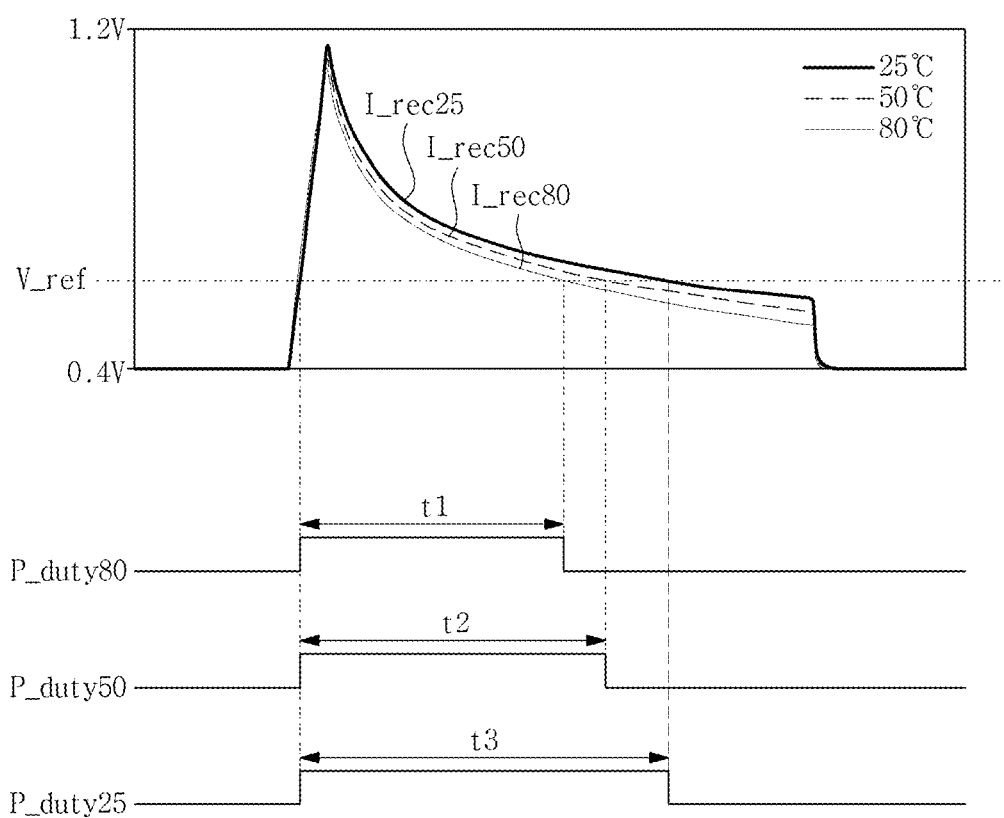
FIG. 9B is a waveform diagram illustrating a rectified signal obtained by rectifying a data current depending on the temperature.

FIG. 9B is a waveform diagram illustrating the rectified signal I_rec and the sensing pulse P_duty depending on the temperature.

FIG. 9A shows the data current I_data measured at the temperature of the liquid crystal layer of about 25° C., about 50° C. and about 80° C. As the temperature of the liquid crystal layer increases, the capacitance of the pixel capacitor decreases.

The data current I_data does not have a large deviation depending on the temperature in the rising period. However, the data current I_data exhibits a less current value as the temperature increases in the sustain period in which the pixel capacitor is charged while the data signal V_data maintains the electric potential. This is because the permittivity decreases as the temperature of the liquid crystal layer rises and the capacitance of the pixel capacitor Clc also decreases.

FIG. 9B is a waveform diagram illustrating the rectified signal obtained by rectifying the data current according to the temperature.

The rectified signal I_rec of the data current I_data described in an exemplary embodiment is obtained by converting a current value into a voltage form for convenience of signal processing. In an exemplary embodiment, the representation and description of the current signal I_rec substantially represent the form of voltage.

Referring to FIG. 9B, the rectified signal I_rec is represented as voltage waveforms of I_rec25, I_rec 50 and I_rec80 at respective temperatures of the liquid crystal layer of about 25° C., about 50° C. and about 80° C. A high temperature rectified signal I_rec80 is represented as a voltage lower than a voltage of a low temperature rectified signal I_rec25.

The rectified signal I_rec, as the data current I_data, is represented as a lower voltage as the temperature is higher. The pulse generator 340 (refer to FIG. 7) sets the reference voltage Vref to detect a change of the rectified signal I_rec depending on the temperature and detects the rectified signal I_rec higher than the reference voltage Vref to generate the sensing pulse P_duty.

The rectified signal I_rec according to each temperature is produced as sensing pulses P_duty25, P_duty50 and P_duty80 by the rectified signals I_rec25, I_rec50 and I_rec80. The sensing pulse P_duty has a narrower pulse width as the temperature is higher (e.g., t1<t2<t3).

The reference voltage Vref may be set to be a voltage at which the sensing pulse P_duty may be generated for all the temperature conditions. That is, the reference voltage Vref may be set within a range that is higher than a lowest voltage of the low temperature condition and less than a highest voltage of the high-temperature condition. In order to improve identification of the sensing pulse P_duty depending on the temperature change, it is preferable that the reference voltage Vref be set as a voltage close to and higher than the lowest voltage under the low temperature condition. When the reference voltage Vref is set too high, the pulse width of the sensing pulse P_duty does not greatly change depending on the temperature and it may be difficult to detect the accurate temperature.

Figure 10:
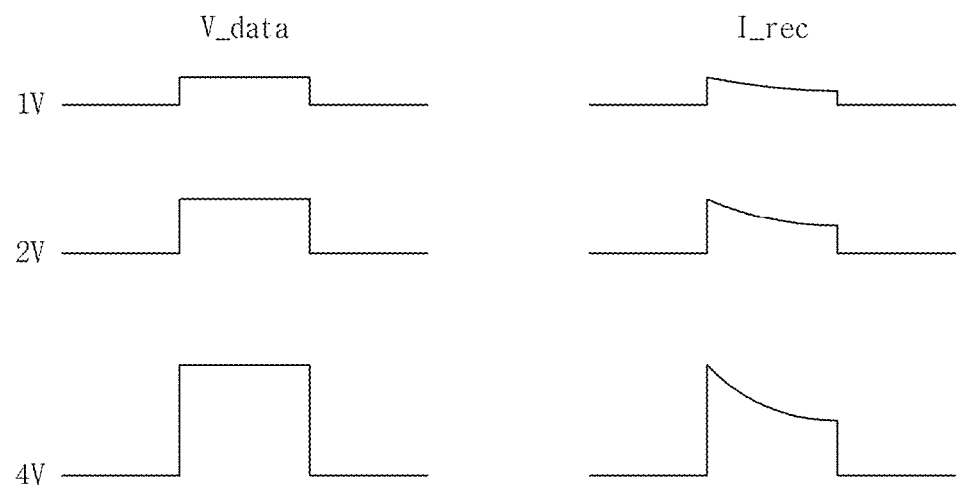
FIG. 10 is a waveform diagram illustrating a rectified signal depending on the voltage of the data signal.

FIG. 10 is a waveform diagram of a rectified signal depending on the voltage of the data signal.

FIG. 10 shows the rectified signal I_rec when the data signal V_data is 1V, 2V and 4V at a substantially same temperature. Referring to FIG. 10, when the data signal V_data is a low voltage of 1 V, the magnitude of the data current I_data is also low and the voltage of the rectified signal I_rec is low. When the data signal V_data increases to 2V or 4V, the magnitude of the data current I_data also increases and the voltage of the rectified signal I_rec also increases proportionally.

As illustrated in FIG. 10, when the temperature of the liquid crystal layer is substantially the same, the voltage of the rectified signal I_rec fluctuates as the magnitude of the data signal V_data varies, and the temperature may not be detected by setting the reference voltage Vref that remains constant.

Figure 11:
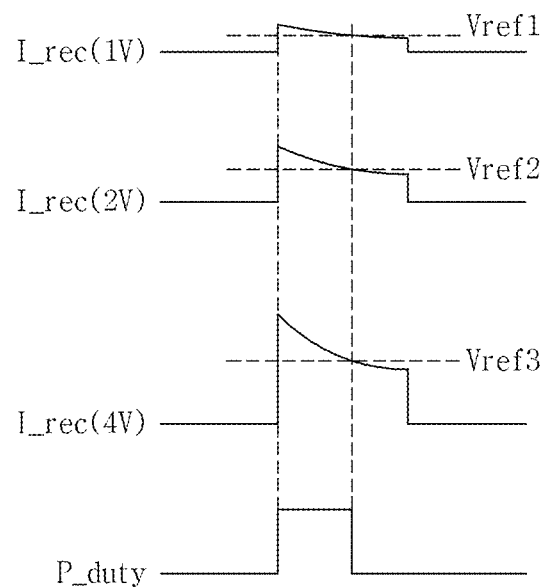
FIG. 11 is a waveform diagram of a detected sensing pulse depending on the change in the data signal voltage.

FIG. 11 is a waveform diagram of a detected sensing pulse depending on the change in the data signal voltage.

Referring to FIG. 11, respective rectified signals I_rec have different voltages when the data signal V_data is 1V, 2V and 4V under a substantially same temperature condition.

The pulse generator 340 (refer to FIG. 7) compares the rectified signal I_rec (1V) when the data signal V_data is 1V with a first reference voltage Vref1 to calculate the sensing pulse P_duty. The pulse generator 340 compares the rectified signal I_rec (2V) when the data signal V_data is 2V with a second reference voltage Vref2 to calculate the sensing pulse P_duty. The sensing pulse P_duty may be calculated similarly by comparing the rectified signal I_rec (4V) when the data signal V_data is 4V with a third reference voltage Vref3.

In the case where the temperature of the liquid crystal layer is substantially the same, although the data signal V_data fluctuates, the sensing pulse P_duty having a substantially same pulse width may be output by adjusting the reference voltage Vref in conjunction therewith.

The reference voltage Vref variable in proportion to a variation amount ΔV of the data signal voltage may be obtained by the following Equation 2.

Reference voltage $Vref=[(\text{conversion constant})/(Vcom)]*(V\_dataN-1-VdataN)$    <Equation 2>

In the above Equation 2 for determining the reference voltage, the conversion constant is a constant value determined according to the structure of the panel and the material of the liquid crystal layer. In the above Equation 2, Vcom denotes a common electrode voltage, VdataN denotes a currently applied data signal voltage and V_dataN-1 denotes a data signal voltage applied in the previous horizontal synchronization period.

The reference voltage Vref is proportional to the voltage difference ΔV between a data signal applied in the previous horizontal synchronization period and the currently applied data signal and is inversely proportional to the common electrode voltage Vcom. Although the magnitude of the data signal V_data is changed, the pulse generator 340 may generate a constant sensing pulse P_duty by applying the variable reference voltage V_ref according to an exemplary embodiment.

The temperature sensor 300 according to an exemplary embodiment may apply a test pattern to detect the temperature of the liquid crystal layer of the display panel 100. However, it is not invariably necessary to apply the test pattern. The temperature sensor 300 according to an exemplary embodiment may detect the temperature of the liquid crystal layer in real time in an operating state in which the display panel 100 displays image information which is externally input thereto.

Figure 12:
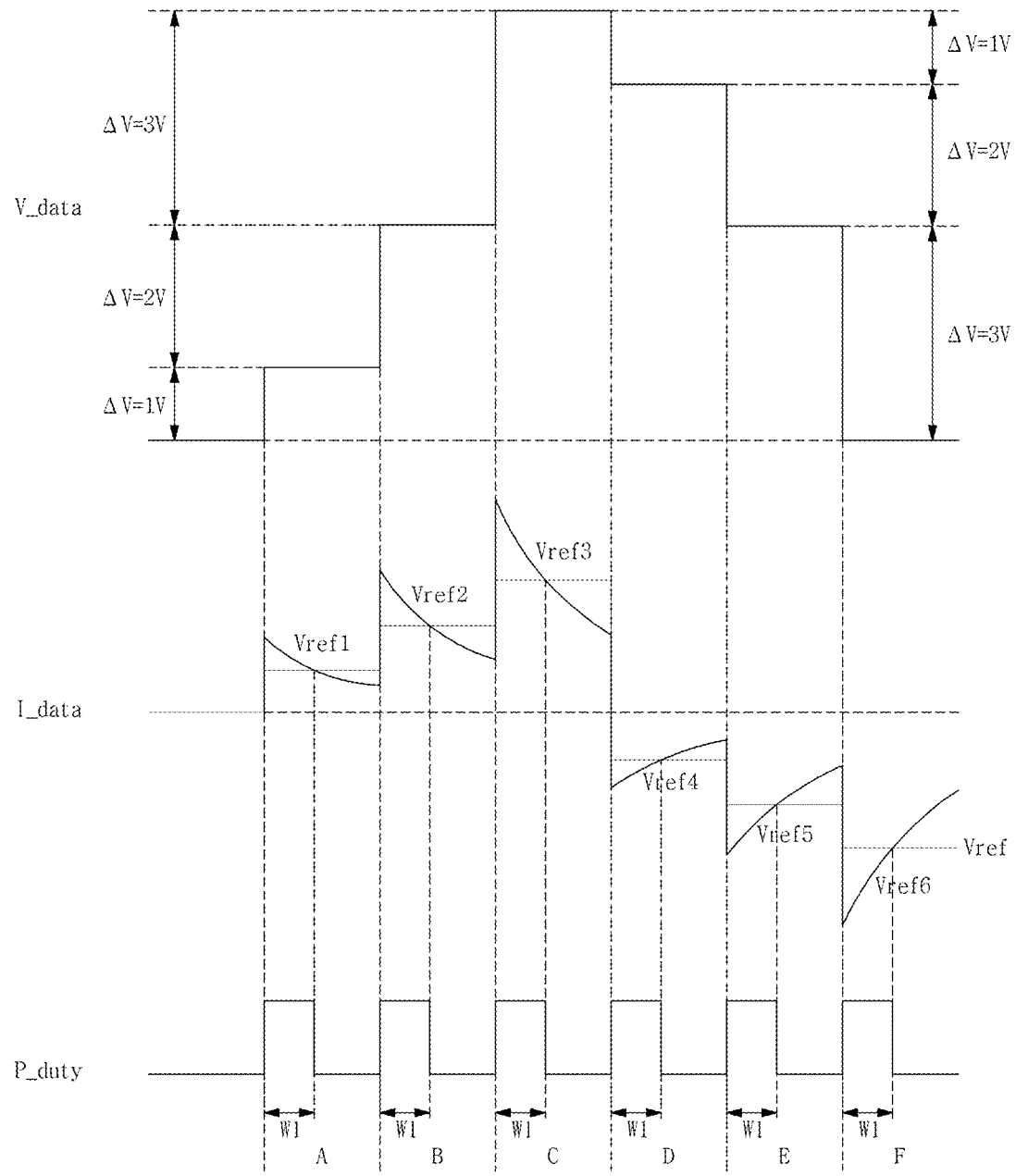
FIG. 12 is a waveform diagram illustrating a data signal voltage and a reference voltage.

FIG. 12 is a waveform diagram of a data signal voltage and a reference voltage.

Referring to FIG. 12, the data signal V_data is applied in a step waveform of 0V, −1V, −3V, −6V, −5V, −3V and −0V. A period in which the data signal V_data is applied is divided into A, B, C, D, E and F sections according to the magnitude of each voltage.

In period A, the data signal V_data rises from 0V to 1V and in such an exemplary embodiment, the voltage difference ΔV is about 1V. In the period A, the data current I_data increases and then decreases gradually. In FIG. 12, it is assumed that the sensing current P_duty is calculated by comparing the data current I_data with the reference voltage Vref without the process of rectifying and amplifying the data current I_data for convenience of explanation. In the period A, the first reference voltage Vref1 is determined and applied as the reference voltage Vref. The first reference voltage Vref1 is determined in proportion to the voltage difference ΔV based on the Equation for determining the reference voltage Vref. The sensing pulse P_duty of the period A has a pulse width W1 for a period in which the data current I_data is higher than the first reference voltage Vref1.

In period B, the data signal V_data rises from 1V to 3V and in such an exemplary embodiment, the voltage difference ΔV is about 2V. In the period B, the second reference voltage Vref2 is determined and applied as the reference voltage Vref. The second reference voltage Vref2 has a voltage value higher than that of the first reference voltage Vref1. The sensing pulse P_duty of the period B has a pulse width W1 for a period in which the data current I_data is higher than the second reference voltage Vref2. The sensing pulse P_duty has a substantially same pulse width W1 in the period A and the period B.

In period C, the data signal V_data increases from 3V to 6V and in such an exemplary embodiment, the voltage difference ΔV is about 3V. In the period C, a third reference voltage Vref3 is determined and applied as the reference voltage Vref. The third reference voltage Vref3 has a voltage value higher than that of the second reference voltage Vref2. The sensing pulse P_duty of the period C has a pulse width W1 for a period in which the data current I_data is higher than the third reference voltage Vref3. The sensing pulse P_duty has a substantially same pulse width W1 in the period A, period B and period C.

In period D, the data signal V_data falls from 6V to 5V. In such an exemplary embodiment, the voltage difference ΔV is about −1V. The data current I_data exhibits a negative polarity in a period in which the data signal V_data falls. In FIG. 12, a negative polarity is illustrated for convenience of explanation, but the negative current is rectified into a positive polarity in the rectifying amplifier 320 (refer to FIGS. 6 and 7) of the temperature sensor 300 (refer to FIGS. 6 and 7) to be calculated.

The sensing pulse P_duty in the period D has a pulse width W1 for a period in which the data current I_data has an absolute value larger than that of a fourth reference voltage Vref4. The sensing pulse P_duty has a substantially same pulse width W1 in the period A, period B, period C and period D.

Hereinafter, the reference voltage Vref varies in accordance with the change of the data signal V_data in period E and period F, such that the sensing pulse P_duty may have a substantially same pulse width W1. The reference voltage Vref is determined by the voltage difference ΔV between successively applied data signals V_data regardless of the temperature of the liquid crystal layer.

Figure 13:
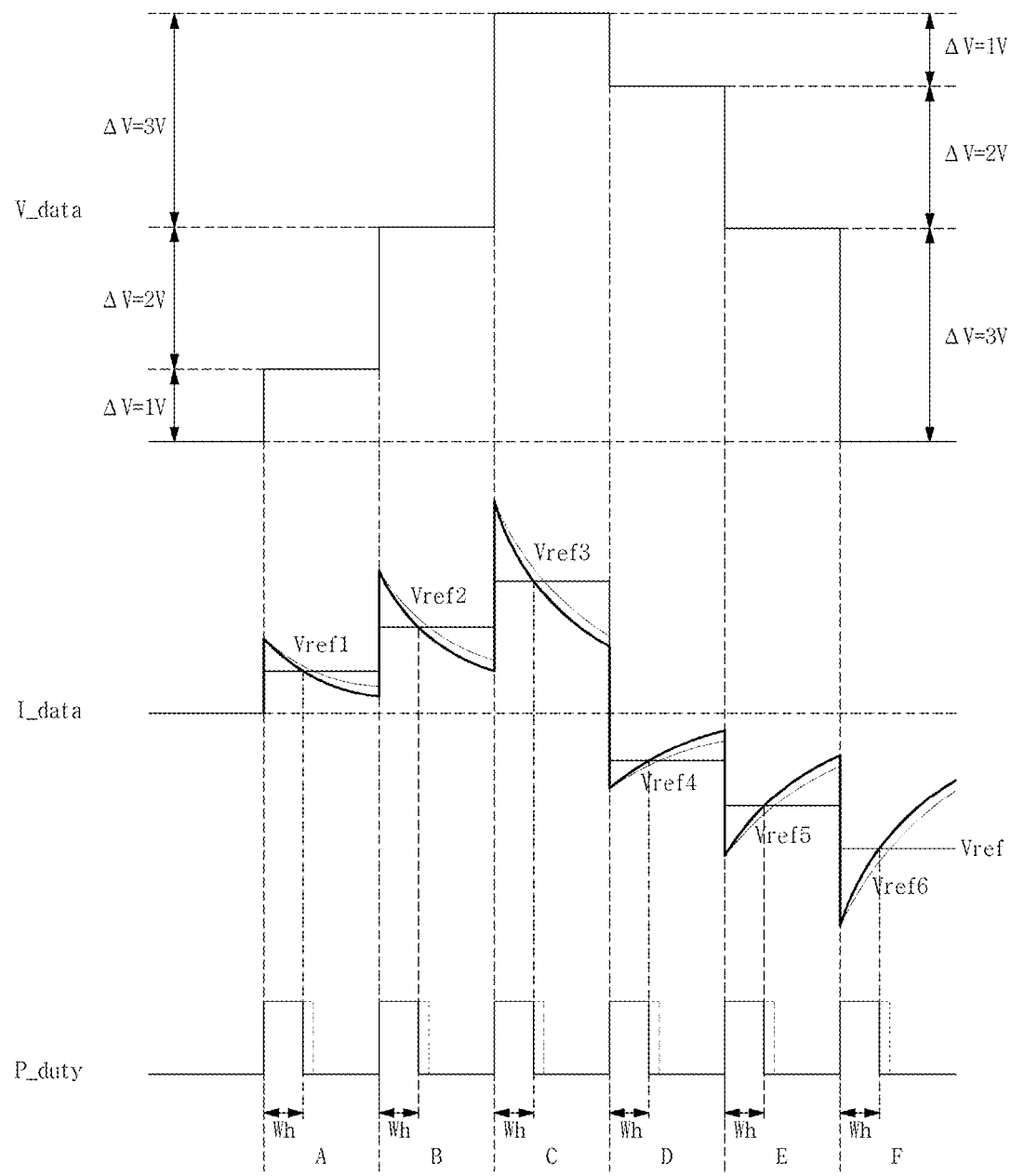
FIG. 13 is a waveform diagram illustrating the comparison between the data signal voltage and the reference voltage in FIG. 12 at a high temperature.

FIG. 13 is a waveform diagram illustrating the comparison between the data signal voltage and the reference voltage in FIG. 12 at a high temperature.

Referring to FIG. 13, a data signal V_data, a data current I_data, a reference voltage Vref and a sensing pulse P_duty at a high temperature are illustrated. Although the data signal V_data is applied under the same condition as in FIG. 12, the temperature of the liquid crystal layer rises, the charge capacity of the pixel capacitor Clc (refer to FIGS. 3 and 4) decreases, and the data current I_data applied thereby is reduced. Since the reference voltage Vref is determined according to the change of the data signal V_data, it is determined irrespective of the temperature. Accordingly, the reference voltage Vref illustrated in FIG. 13 has a substantially same voltage value as the reference voltage Vref in FIG. 12.

The sensing pulse P_duty is set to have a high potential for a period in which the data current I_data exceeds the reference voltage Vref. As the data current I_data at the high temperature condition decreases, the pulse width Wh of the sensing pulse P_duty becomes less than the sensing pulse width W1 in the low temperature state as illustrated in FIG. 12.

However, although the data input value varies depending on the variance of the reference voltage Vref, the pulse width Wh of the sensing pulse P_duty may be kept constant.

Figure 14:
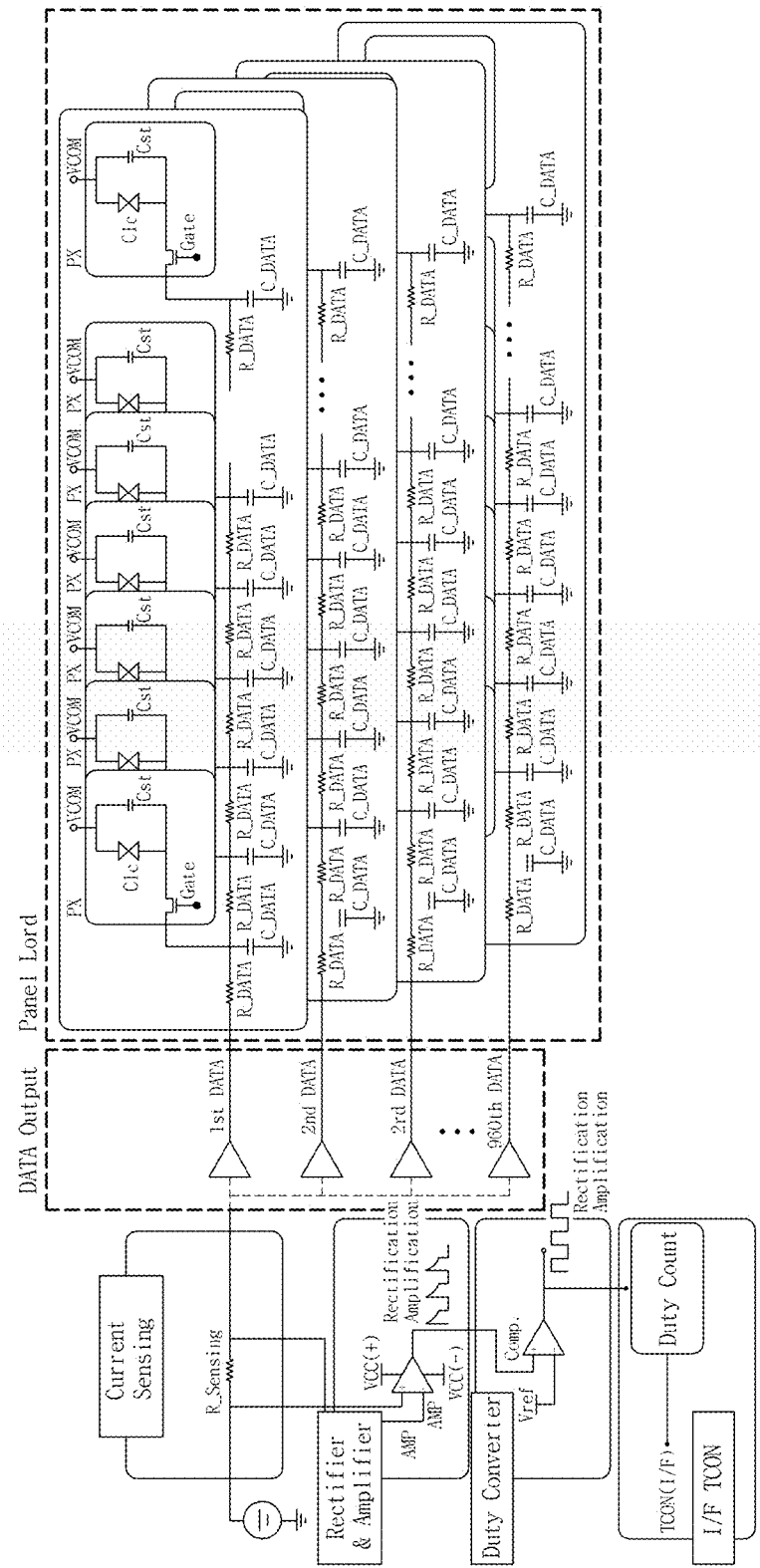
FIG. 14 is a circuit diagram illustrating an alternative exemplary embodiment a temperature sensor.

FIG. 14 is a circuit diagram illustrating a temperature sensor according to an alternative exemplary embodiment.

Referring to FIG. 14, an output buffer outputting a data signals to each of the data lines DL1 to DLm of the panel is connected to the sensing resistor R-Sensing, and the sensing resistor R-Sensing is connected to a DC power terminal of the data signal and integrally senses the data current I_data applied to the plurality of data signals in synchronization with the gate signal.

The sensed data current I_data may be amplified by the rectifying amplifier 320 as described in FIGS. 6 and 7 and used by the pulse generator 340 to generate a sensing pulse and detect the temperature of the liquid crystal layer.

Since the current applied to the plurality of data lines DL (refer to FIG. 2) has a value larger than the current applied to a single data line DL, measurement errors may be reduced. In addition, as compared with the case where the temperature sensor 300 is separately provided in each of the data lines DL, the costs of the circuit configuration may be reduced.

However, in setting the reference voltage Vref, the application pattern of all the data signals V_data applied to the plurality of data lines DL connected to the sensing resistor R-Sensing needs to be considered.

Figure 15A:
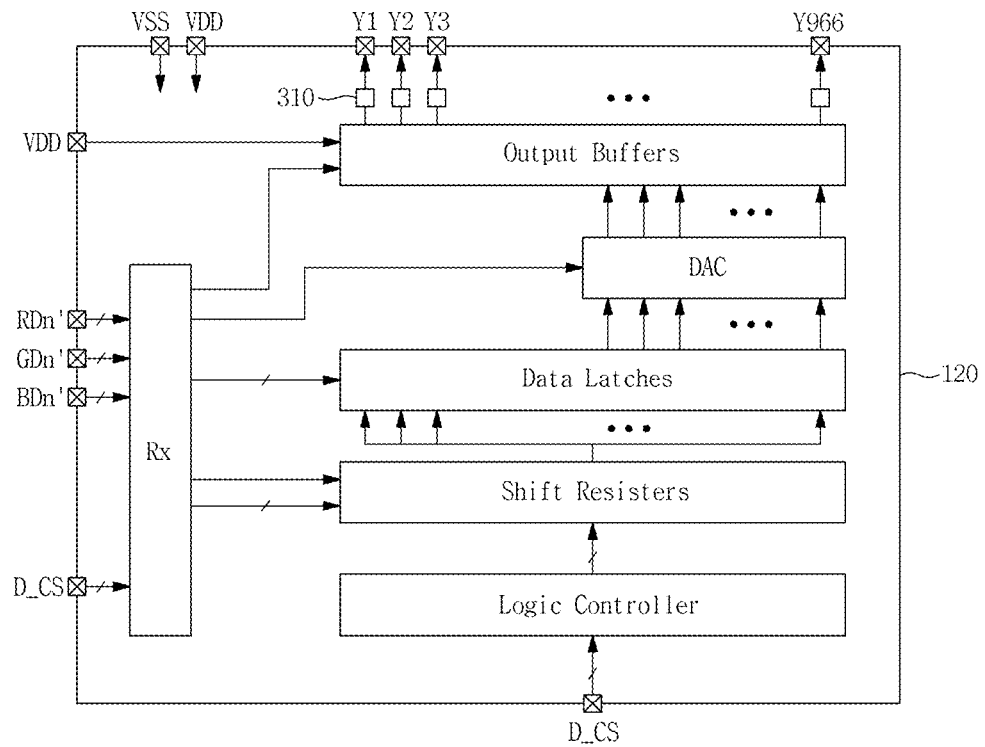
FIGS. 15A and 15B are block diagrams illustrating the arrangement position of a sensing resistor in a data driver.
Figure 15B:
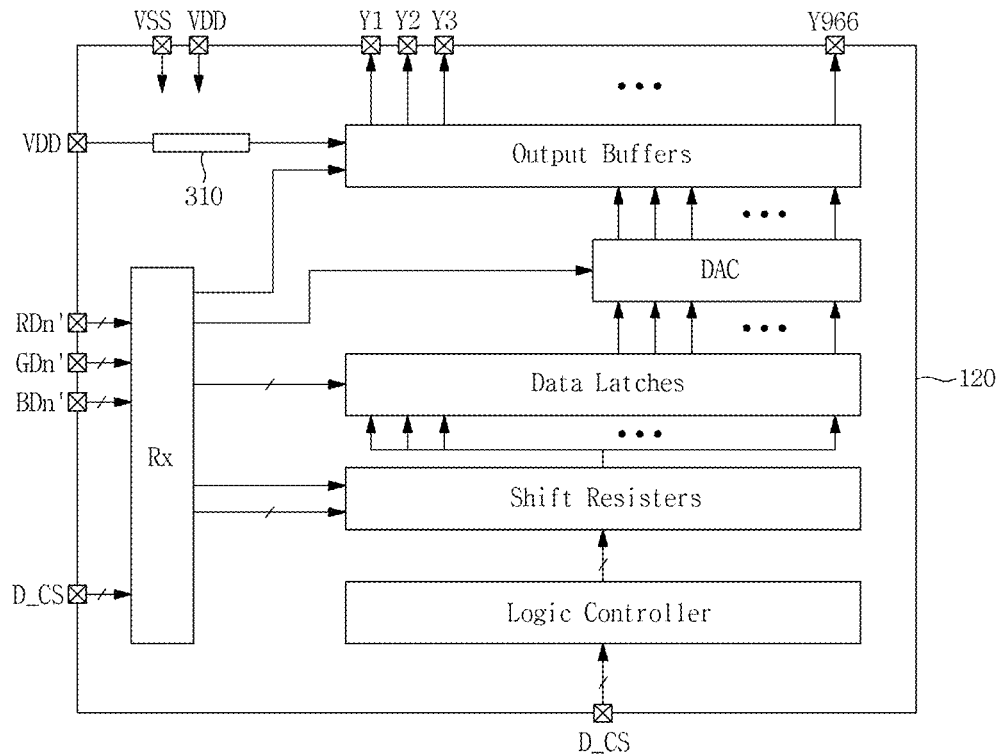

FIGS. 15A and 15B are block diagrams illustrating the arrangement position of the sensing resistor in the data driver.

Referring to FIG. 15A, the data driver 120 receives image data RDn', GDn' and BDn' and a control signal D_CS from the T-CON 150 (refer to FIGS. 2 and 6). A shift register and a latch unit distribute an image data according to each data line and a digital-analog converter DAC converts the digital image data into an analog signal. The output buffer serves to amplify the current of the output image signal. These functions are substantially the same as those applied to general data driver ICs.

The data driver 120 according to an exemplary embodiment may further include a current sensor 310 positioned at an output terminal of the output buffer. The current sensor 310 may be positioned at an output portion of the output buffer to sense the data current I_data corresponding to each individual data line DL. The sensed data current I_data is transmitted to the temperature sensor 300 outside the data driver 120 and used in calculating the temperature of the liquid crystal layer of the display panel 100 (refer to FIGS. 2 and 6). The current sensor 310 illustrated in FIG. 15A may detect the data current I_data (refer to FIGS. 8, 12 and 13) applied for each data line DL (refer to FIG. 2). The temperature sensor 300 may detect the temperature of each pixel based on the sensing result of the current sensor 310.

FIG. 15B is a configuration diagram illustrating a current sensor 310 according to an alternative exemplary embodiment. Referring to FIG. 15B, the current sensor 310 may be positioned between a power input terminal VDD of the data driver 120 and an input terminal of an output buffer. The current sensor 310 may detect an integrated data current I_data applied to pixels through output data lines Y1 to Y966 of the output buffers. The temperature sensor 300 may calculate the temperature based on the data current I_data sensed by the current sensor 310. The temperature of the individual pixels may not be measured by the current sensor 310 illustrated in FIG. 15B, but the temperature may be detected by the unit of pixel blocks including a plurality of pixels.

Considering the characteristic of the display panel 100 that the temperature deviation between adjacent pixels is not large and the temperature change is gentle, the scheme of measuring the temperature with respect to a plurality of pixels through the use of the current sensor 310 illustrated in FIG. 15B is one of the practically applicable temperature detection methods.

Although only the current sensor 310 is disposed in the data driver 120 in FIGS. 15A and 15B. The data driver 120, however, may further include some functional blocks of the temperature sensor 300, such as a rectifying amplifier 320 (refer to FIGS. 6 and 7) or a reference voltage conversion unit 330 (refer to FIGS. 6 and 7). In addition, the data driver 120 may further include the entirety of the temperature sensor 300 (refer to FIG. 6).

Figure 16:
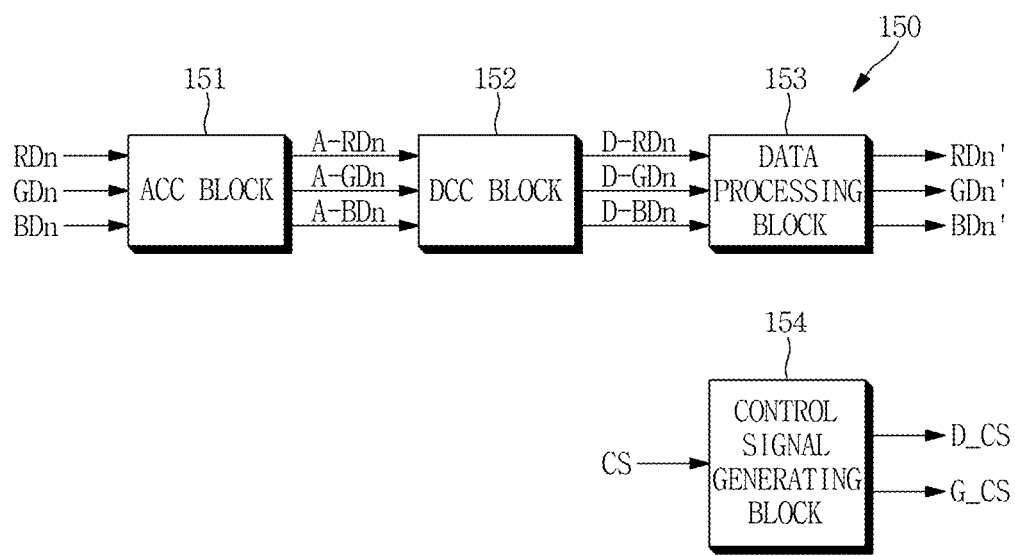
FIG. 16 is a data correction block diagram illustrating a display device to which an exemplary embodiment of the temperature sensor is applied.

FIG. 16 is a data correction block diagram of a display device to which the temperature sensor according to an exemplary embodiment is applied.

Referring to FIG. 16, the T-CON 150 includes an automatic chroma correction block (hereinafter, 'ACC block')

151, a dynamic capacitance compensation block (hereinafter, 'DCC block') 152, a data processing block 153 and a control signal generating block 154.

The ACC block 151 performs gamma correction on red, green and blue input image data RDn, GDn and BDn based on predetermined correction gamma values based on the gamma characteristics of the display panel 100, and outputs corrected red, green and blue image data A-RDn, A-GDn and A-BDn. That is, the red, green and blue gamma characteristics of the display panel 100 are different from each other and the display panel 100 exhibits different luminance values for the red, green and blue input image data RDn, GDn and BDn that have a substantially same gray level.

In order to compensate for this luminance difference, the ACC block 151 sets reference gamma characteristic and sets a deviation for each gray level between the reference gamma characteristic and the respective red, green and blue gamma characteristics as the correction gamma value. Accordingly, the ACC block 151 compensates for the luminance difference by adding or subtracting the correction gamma values corresponding to the red, green and blue input image data RDn, GDn and BDn, respectively.

Figure 17:
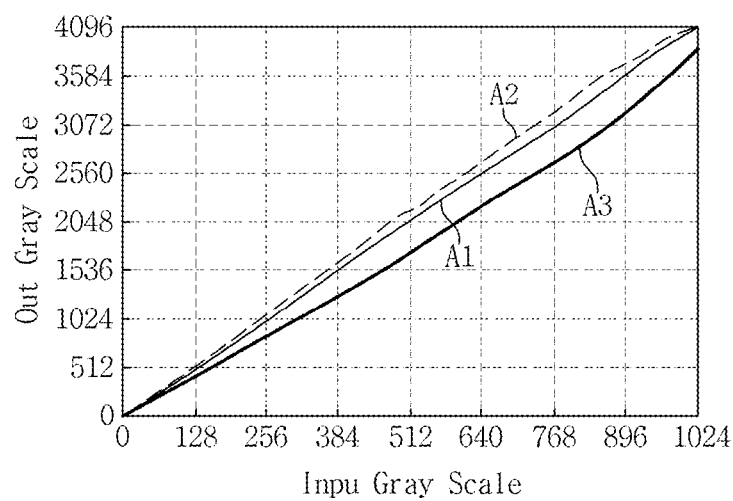
FIG. 17 is a view illustrating output gray levels of red, green and blue data depending on an input gray level of an ACC block illustrated in FIG. 16.

FIG. 17 is a view illustrating output gray levels of red, green and blue data depending on an input gray level of the ACC block illustrated in FIG. 16.

In an exemplary embodiment, in FIG. 17, a first graph A1 shows an output gray level according to an input gray level of a green data, a second graph A2 shows an output gray level according to an input gray level of a red data and a third graph A3 shows an output gray level corresponding to an input gray level of a blue data, for example.

As illustrated in FIG. 17, although the red, green and blue input image data RDn, GDn and BDn are provided to the ACC block 151 (refer to FIG. 16), having a substantially same gray level, the ACC block 151 compensates for the red, green and blue input image data RDn, GDn and BDn to have different gray level values, thereby reducing aforementioned luminance difference. In an exemplary embodiment, FIG. 17 shows an example in which a data is corrected to an expanded number of bits as compared to the number of bits of the data input to the ACC block 151, for example. In an exemplary embodiment, the ACC block 151 receives the red, green and blue input image data RDn, GDn and BDn having a substantially same gray level value of 512 and outputs a green data A-GDn having a gray level of 2048, a red data A-RDn having a gray level higher than 2048 and a blue data A-BDn having a gray level less than 2048, for example. Accordingly, white color coordinates by the red, green and blue data A-RDn, A-GDn and A-BDn may be kept almost constant in all gray levels and accordingly, the color characteristics of the display panel 100 may be improved.

In such an exemplary embodiment, when the temperature of the display panel 100 is changed, the degree of delay of the data signal applied to the pixel changes, and thus the response speed of the liquid crystal material may also generate a difference. In an exemplary embodiment, it is possible to precisely detect the temperature of the liquid crystal layer by the temperature sensor 300 (refer to FIG. 6) and perform accurate correction by reflecting the temperature characteristic to the color correction value accurately. It is also possible to apply different color correction values to a part of the entire panel when the temperature deviation is different depending on the positions of the pixels.

That is, the display panel 100 (refer to FIGS. 2 and 6) is divided into a plurality of pixel blocks based on the temperature of the liquid crystal layer and different gamma compensation values may be applied to the pixel blocks, respectively, thereby correcting the image data.

The DCC block 152 illustrated in FIG. 16 corrects a gray level value of a current image signal based on a predetermined correction value according to a difference between gray levels of the current image signal and a previous image signal in order to improve response speed of the current frame. That is, the DCC block 152 increases the gray level value of the current image signal from a target gray level value. To this end, a red lookup table storing a red correction value used for compensating the red data A-RDn, a green lookup table storing a green correction value used for compensating the green data A-GDn and a blue look-up table storing a blue correction value used to compensate for the blue data A-BDn may be stored.

Figure 18:
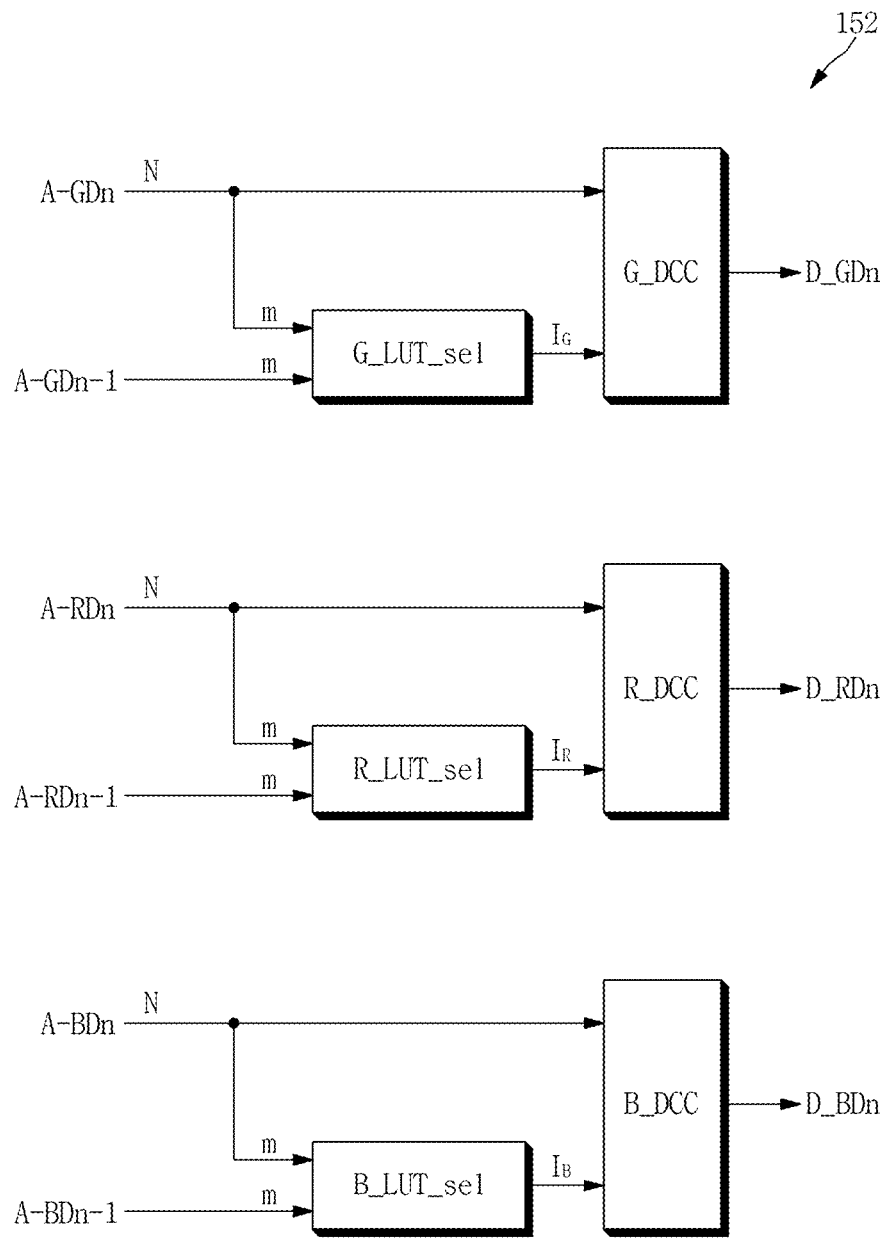
FIG. 18 is a block diagram illustrating an example of an internal structure of a DCC block illustrated in FIG. 16.

FIG. 18 is a block diagram illustrating an example of an internal structure of a DCC block illustrated in FIG. 16.

The DCC block 152 includes a green data compensator G_DCC, a red data compensator R_DCC and a blue data compensator B_DCC.

In an exemplary embodiment, the green data compensation unit G_DCC selects a green lookup table G_LUT_sel corresponding to the temperature of the sensed liquid crystal layer among a plurality of stored green lookup tables and compensates the green data A-GDn by using the green correction value of the selected green lookup table G_LUT_sel, for example.

The selected green lookup table G_LUT_sel(R_LUT_sel for red, B_LUT_sel for blue,) receives upper m bits of the green data A-GDn (A-RDn for red, A-BDn for blue) of the current frame and upper m bits of the green data A-GDn−1 (A-RDn−1 for red, A-BDn−1 for blue) of a previous frame stored in a memory (not illustrated) and outputs an m-bit green correction value $I_G$ ($I_R$ for red, $I_B$ for blue) corresponding thereto. Accordingly, the green data compensation unit G_DCC outputs the green compensation data D_GDn (D_RDn for red, D_BDn for blue) of N bits using the green correction value $I_G$ and lower bits of the green data A-GDn of the current frame. That is, in order to improve the response speed, the green compensation data D_GDn has a higher gray level value than that of the green data A-GDn.

The red data compensation unit R_DCC and the blue data compensation unit B_DCC also perform a substantially same operation as in the green data compensation unit G_DCC. However, different compensation values may be stored in the lookup table for each color.

The DCC block 152 serves to correct the value of the image data to compensate for the delay in the response speed of the display panel 100 (refer to FIGS. 2 and 6). Since the response speed of the display panel 100 changes sensitively depending on the temperature, the compensation may be performed based on the temperature value of the liquid crystal layer calculated through the temperature sensor 300.

In an exemplary embodiment, since the response speed increases as the temperature of the liquid crystal layer rises, it is preferable that the data correction value stored in the lookup table to be applied to each data compensator have a lower value, for example. When the temperature of the liquid crystal layer is lowered, the response speed decreases, so it is desirable to increase each correction value.

As such, the temperature-dependent correction may be performed by selecting one of a plurality of lookup tables to refer to as exemplified. In an alternative exemplary embodiment, a temperature correction constant may be applied to the correction value of the reference look-up table to generate a correction value.

Figure 19:
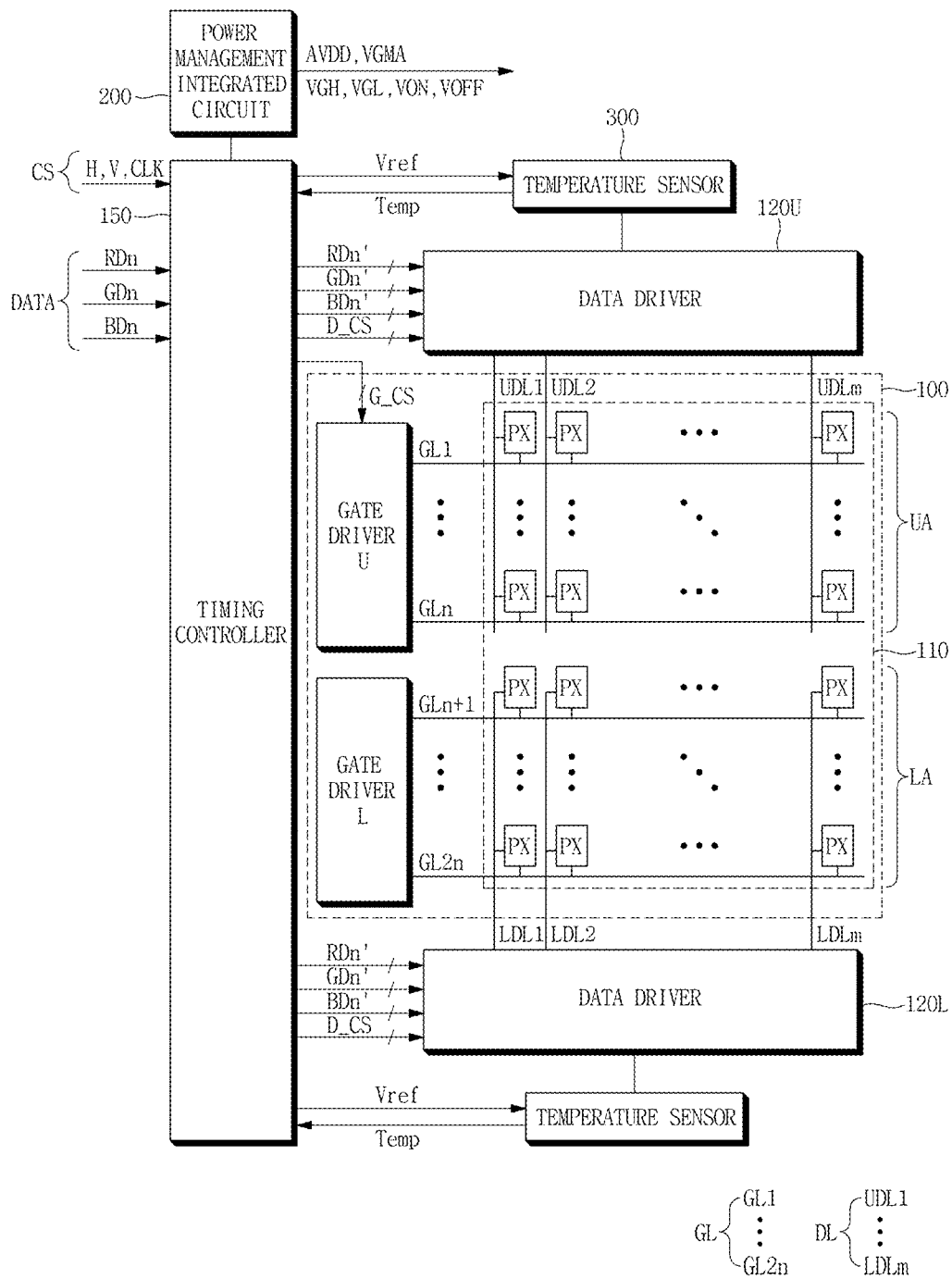
FIG. 19 is a configuration view illustrating a display panel in which a data line is divided into upper and lower portions.

FIG. 19 is a configuration view illustrating a display panel in which a data line is divided into upper and lower portions.

Referring to FIG. 19, the display panel 100 is divided into an upper area UA in which the data line DL extends from an upper portion of the panel and a lower area DA in which the data line DL extends from a lower portion of the panel. The upper area UA receives a data signal V_data (refer to FIG. 21) from an upper data driver 120U, while the lower area LA is receives the data signal V_data from a lower data driver 120L.

Since the display panel 100 is divided into the upper portion and the lower portion, the data signal V_data may be written simultaneously in the upper area UA and the lower area DA, thereby shortening the time desired for the data writing operation.

The upper data driver 120U and the lower data driver 120L each include a current sensor 310 (refer to FIGS. 6, 7, 15A and 15B) and may individually measure the temperature of the display panel 100. The current sensor 310 may detect the temperature of the liquid crystal layer in each area and transmit the sensed temperature to the data controller 150.

Figure 20:
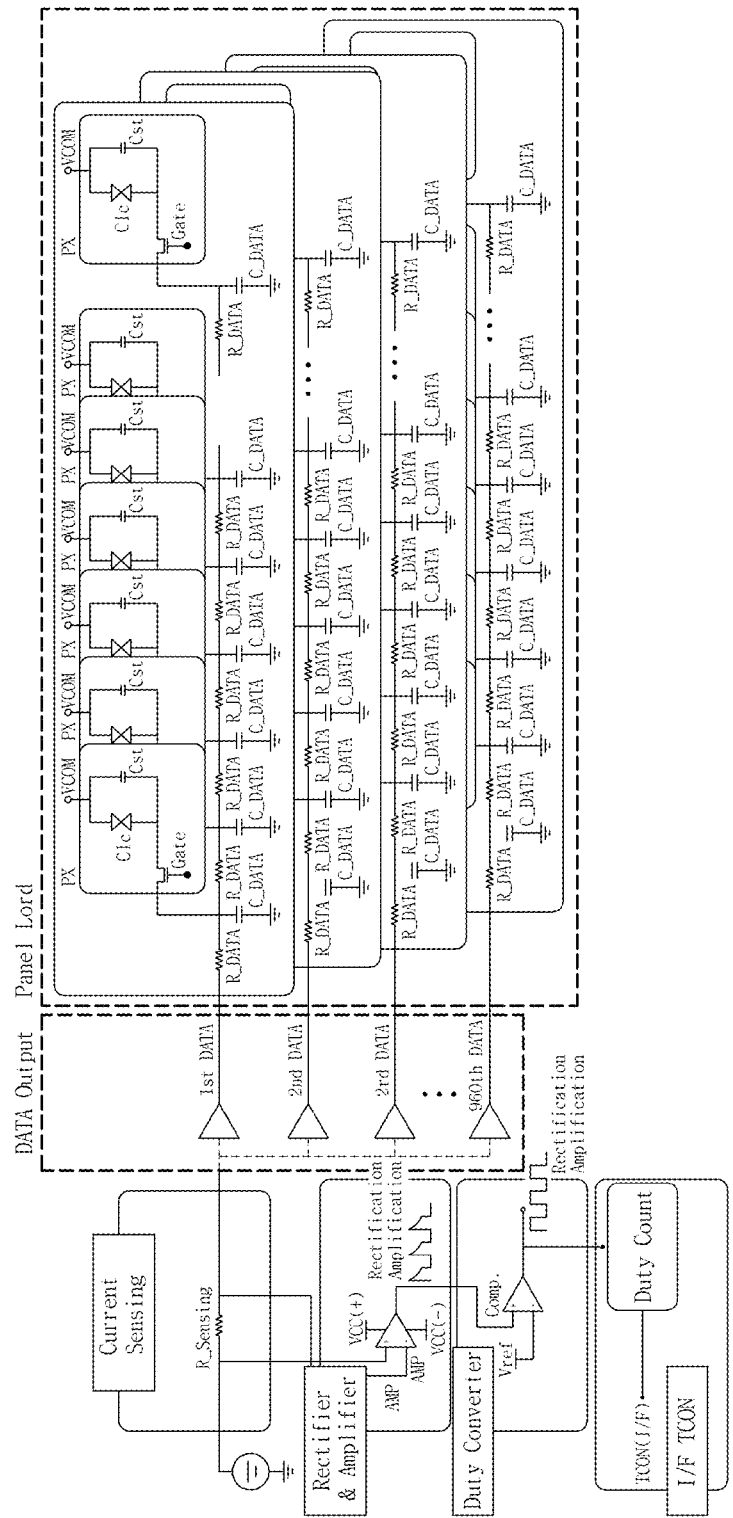
FIG. 20 is a compensation waveform diagram illustrating a gate signal depending on the temperature.

FIG. 20 is a compensation waveform diagram illustrating a gate signal depending on the temperature.

The greater the distance between the data driver 120 and the pixel in the display panel 100 (refer to FIGS. 1 and 19), the more the data signal V_data applied to the pixel is affected by the parasitic resistor R_DATA (refer to FIGS. 3 and 4) and the capacitor C_DATA (refer to FIGS. 3 and 4). The pixel PX (refer to FIGS. 2 to 4 and 19) receives the data signal V_data delayed in proportion to the spacing distance. The gate signal is output from the gate driver 130 (refer to FIG. 2) in synchronization with the data signal V_data (refer to FIGS. 5A, 5B, 8, 10, 12 and 13). Accordingly, due to the delay occurring in the data signal V_data, the pixel PX receives the gate signal and the data signal V_data at staggered timings.

In order to address such an issue, the gate signal applied to a pixel having a large distance from the data driver 120 may be applied with a predetermined time delay considering the delay time of the data signal V_data. The application timing of the gate signal may coincide with the application timing of the data signal V_data by delaying the application timing of the gate signal. Referring to the gate signal under the low temperature condition in FIG. 19, the gate signals applied to the gate line GLn−1 and the gate line GLn having a great distance from the data driver is applied by a delay of a low temperature separation time DT_low.

However, when the temperature of the display panel 100 rises, the capacity of the pixel capacitor Clc (refer to FIGS. 3 and 4) of the pixel PX is reduced and the operating conditions of the liquid crystal may also change.

When the temperature of the display panel 100 rises, the display device according to an exemplary embodiment may change the application timing of the gate signal depending on the temperature.

The liquid crystal capacitor Clc of the pixel PX under the high temperature condition has a small capacity of the capacitor and thus the RC delay generated in the data signal V_data becomes small. The gate driver 130 may correct the application timing of the gate signal applied to the pixel in accordance with the temperature condition and the degree of separation from the data driver 120. Referring to FIG. 19, the gate signals applied to the (n−1)-th gate line GLn−1 and the n-th gate line GLn having a great distance from the data driver 120 are applied with a delay of a high temperature separation time DT_high. In general, the high temperature separation time DT_high has a less value than the low temperature separation time DT_low.

Figure 21:
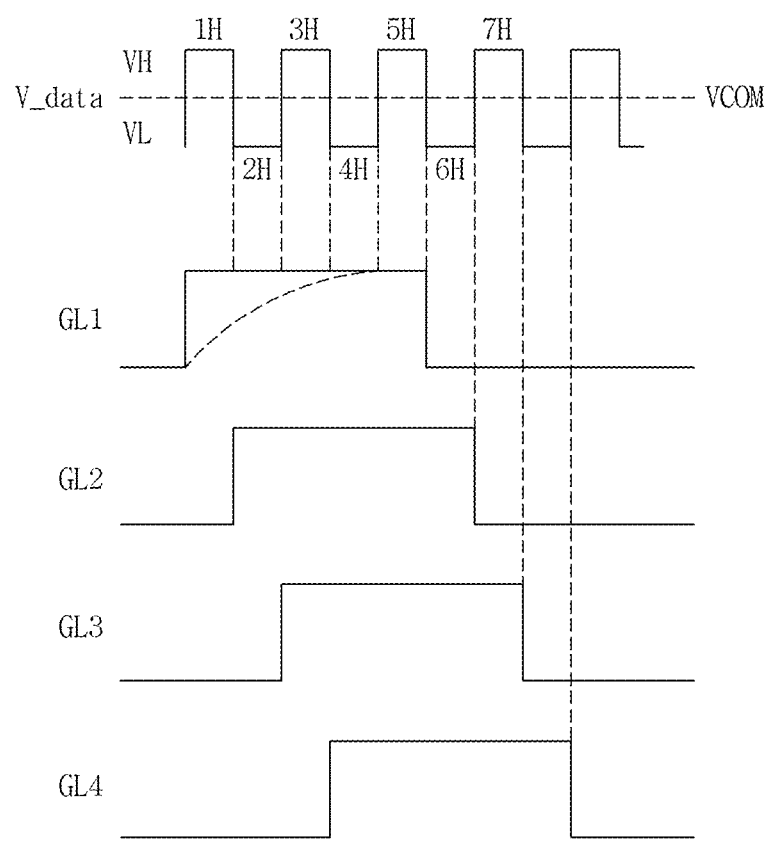
FIG. 21 is a waveform diagram illustrating the data signal voltage including pre-charge.

FIG. 21 is a waveform diagram illustrating a data signal voltage including pre-charge.

Referring to FIG. 21, the data signal V_data is continuously applied in the form of a pulse including a positive voltage VH and a negative voltage VL with respect to the common electrode voltage Vcom. When driven by a frame of 120 hertz (Hz), the data signal V_data is applied with a pulse width of about 3.7 microseconds (μs). A pulse period of a single data signal is denoted by a horizontal synchronization period (hereinafter, '1 H').

The gate signal is applied in synchronization with the data signal V_data and the pulse width is depicted as a period of 4H. The gate signal needs to secure a sufficient time to turn on a driving transistor of an actual pixel in consideration of a rising delay that occurs while applying the gate signal to the pixel through the gate line GL.

In other words, considering the turn-on of the driving transistor, the data signal V_data of the pulse of the first gate signal in the period 1H, period 2H and period 3H is not written to the pixel connected to the first gate signal, and the data signal V_data in the period 4H may be written to the pixel. The application of the data signal V_data before the synchronization point of the data signal V_data is referred to as pre-charge.

A data signal V_data of period 5H is written to a pixel of the second gate line GL2, a data signal V_data of period 6H is written to a pixel of the third gate line GL3, and a data signal V_data of period 7H is written to a pixel of the fourth gate line GL4.

Since the gate signal is written to three consecutive gate lines GL while the data signal V_data is written to a pixel connected to one gate line GL, a capacitor of a pixel connected to the three gate lines GL may partially affect other pixels.

In an exemplary embodiment, when the data signal V_data is written in the period 4H, the gate signal is input to the first, second, third and fourth gate lines GL1, GL2, GL3 and GL4. All of the driving transistors of the first, second, third and fourth gate lines GL1, GL2, GL3 and GL4 may not be turned on due to the delay of the gate signal, but the driving transistors of some of the pixels may start to be turned on, for example. The writing conditions of the data signal V_data written in the period 4H needs to be such that the capacitor conditions of the pixels of the first, second, third and fourth gate lines GL1, GL2, GL3 and GL4 should be considered.

The temperature sensor 300 (refer to FIG. 6) according to an exemplary embodiment may calculate the temperature of the display panel by detecting the data current I_data (refer to FIGS. 8, 12 and 13) of the data signal V_data having a pre-charge condition as illustrated in FIG. 21. In addition, the reference voltage conversion unit 330 (refer to FIGS. 6 and 7) may calculate a variable reference voltage Vref applied to the pulse generator 340 (refer to FIG. 7) by applying different weights according to the turn-on degree of the pixel TFT connected to the plurality of gate lines. In the case where one data signal V_data overlaps the gate signal of the plurality of gate lines, the reference voltage Vref needs to be set to have a higher voltage than the voltage of the case where the data signal V_data overlaps a single gate signal.

In an exemplary embodiment, while influenced by a pixel connected to the first gate line GL1, a current value of the data signal V_data written in the period 4H is further partially influenced by the pixels connected to the second, third and fourth gate lines GL2, GL3 and GL4, and thus the conversion constant applied to Equation 2 needs to be corrected so that a higher reference voltage Vref is set, for example.

As set forth hereinabove, according to one or more exemplary embodiments, the LCD panel may detect the internal temperature of the liquid crystal layer by applying the driving signal to the pixel area and detecting a change in permittivity depending on the temperature change of the liquid crystals inside the pixel.

In addition, according to one or more exemplary embodiments, the LCD device may substantially prevent degradation in image quality caused by an increase in temperature of the LCD panel by changing the gray level voltage or changing the application timing of the driving signal based on the sensed temperature of the liquid crystal layer.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A liquid crystal display device comprising:
an upper substrate;
a lower substrate opposing the upper substrate and comprising a data line and a gate line insulated from the data line;
a liquid crystal layer between the lower substrate and the upper substrate;
a current sensing unit which detects a data current based on a data signal applied to the data line so as to detect a change in a liquid crystal capacitance of the liquid crystal layer;
a rectifying amplifier which rectifies or amplifies the detected data current so as to generate and output a rectified signal;
a reference voltage conversion unit which sets a reference voltage by a voltage difference between data signals successively applied to the data line in real time in an operating state in which the display panel displays image information;
a pulse generator which generates a sensing pulse by comparing the rectified signal with a reference voltage; and
a duty width detector which detects a duty width of the sensing pulse generated by the pulse generator.

2. The liquid crystal display device as claimed in claim 1, further comprising a temperature calculator which calculates a temperature of the liquid crystal layer based on the duty width of the sensing pulse.

3. The liquid crystal display device as claimed in claim 1, wherein the reference voltage is proportional to a voltage difference between the data signal applied to the data line and a data signal applied during a previous horizontal synchronization period.

4. The liquid crystal display device as claimed in claim 3, wherein the reference voltage has a voltage value between a lowest voltage and a highest voltage of the rectified signal corresponding to the data current during a horizontal synchronization period.

5. The liquid crystal display device as claimed in claim 4, wherein the pulse generator generates a plurality of sensing pulses having a substantially same duty width when a temperature of the liquid crystal layer is constant.

6. The liquid crystal display device as claimed in claim 1, wherein the sensing pulse has a narrower pulse width as a temperature of the liquid crystal layer rises.

7. The liquid crystal display device as claimed in claim 1, wherein the current sensing unit comprises at least one of a sensing resistor, a photo-coupler and a current mirror circuit.

8. The liquid crystal display device as claimed in claim 1, further comprising data lines,
wherein the current sensing unit is separately connected to each of the data lines and detects the data current for each of the data lines.

9. The liquid crystal display device as claimed in claim 8, wherein the current sensing unit is integrated with the data driver which applies the data signal to the data line.

10. The liquid crystal display device as claimed in claim 1, further comprising a plurality of data lines,
wherein the current sensing unit is connected to the plurality of data lines and detects the data current by summing the data currents applied to the plurality of data lines.

11. The liquid crystal display device as claimed in claim 1, wherein the rectifying amplifier separates and rectifies a positive current and a negative current of the data current.

12. A liquid crystal display device comprising:
a display panel;
a pixel on the display panel, the pixel comprising a liquid crystal layer having a liquid crystal capacitance which varies depending on a temperature change;
a data driver which applies a data signal to the pixel and a gate driver which applies a gate signal to the pixel;
a timing controller which controls the data driver and the gate driver; and
a temperature sensor which detects a temperature of the liquid crystal layer, and comprises:
a current sensing unit which detects a data current generated by the data signal;
a rectifying amplifier which rectifies or amplifies the detected data current so as to output a rectified signal;
a reference voltage conversion unit which sets a reference voltage by a voltage difference between data signals successively applied to the data line in real time in an operating state in which the display panel displays image information;
a pulse generator which compares the rectified signal with the reference voltage so as to generate a sensing pulse;
a duty width detector which detects a duty width of the sensing pulse output from the pulse generator; and
a temperature calculator which determines the temperature of the liquid crystal layer based on the duty width,
wherein the timing controller corrects an input image data based on the temperature of the liquid crystal layer output from the temperature sensor.

13. The liquid crystal display device as claimed in claim 12, wherein the timing controller receives red, green and blue image data and corrects the red, green and blue image data with a correction gamma value, and
the timing controller corrects the red, green and blue image data by applying a less correction gamma value as the sensed temperature is higher.

14. The liquid crystal display device as claimed in claim 13, wherein the timing controller applies different correction gamma values for respective colors to correct light emission characteristics of red, green and blue pixels.

15. The liquid crystal display device as claimed in claim 12, wherein the timing controller applies a correction value so that an image data of a current frame increases from an image data of a previous frame, and the correction value when the sensed temperature is relatively high is less than the correction value when the sensed temperature is relatively low.

16. The liquid crystal display device as claimed in claim 12, wherein the timing controller increases an application period of the gate signal depending on a degree of separation between the pixel to which the gate signal is applied and the data driver.

17. The liquid crystal display device as claimed in claim 16, wherein the application period of the gate signal by the timing controller is shorter when the sensed temperature is relatively high as compared to the application period of the gate signal when the sensed temperature is relatively low.

18. The liquid crystal display device as claimed in claim 12, wherein the gate driver outputs a plurality of gate signals overlapping one data signal.

19. The liquid crystal display device as claimed in claim 18, wherein one of the plurality of gate signals overlaps a plurality of data signals.

20. The liquid crystal display device as claimed in claim 19, wherein the reference voltage conversion unit varies the reference voltage according to a number of the plurality of gate signals overlapping the data signal.

21. The liquid crystal display device as claimed in claim 1, wherein the duty width of the sensing pulse is kept constant regardless of the variation of the reference voltage.

* * * * *